United States Patent
Tabata et al.

(10) Patent No.: US 12,024,062 B2
(45) Date of Patent: Jul. 2, 2024

(54) SIMULTANEOUS REGENERATIVE BRAKING AND YAW RATE CONTROL FOR A FOUR-WHEEL-DRIVE VEHICLE

(71) Applicant: TOYOTA JIDOSHA KABUSHIKI KAISHA, Toyota (JP)

(72) Inventors: Atsushi Tabata, Okazaki (JP); Masato Nakano, Toyota (JP); Yuki Makino, Aichi-gun (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 326 days.

(21) Appl. No.: 17/152,943

(22) Filed: Jan. 20, 2021

(65) Prior Publication Data
US 2021/0237584 A1 Aug. 5, 2021

(30) Foreign Application Priority Data
Jan. 31, 2020 (JP) .................................. 2020-015731

(51) Int. Cl.
*B60L 7/26* (2006.01)
*B60L 15/20* (2006.01)

(52) U.S. Cl.
CPC .............. *B60L 7/26* (2013.01); *B60L 15/2036* (2013.01); *B60L 2240/22* (2013.01); *B60L 2240/423* (2013.01)

(58) Field of Classification Search
CPC .... B60L 7/26; B60L 15/2036; B60L 2240/22; B60L 2240/423
See application file for complete search history.

(56) References Cited

U.S. PATENT DOCUMENTS

| 5,511,859 | A | * | 4/1996 | Kade | ..................... B60T 13/586 |
| | | | | | 303/3 |
| 2004/0046448 | A1 | * | 3/2004 | Brown | ..................... B60T 8/24 |
| | | | | | 903/910 |
| 2010/0138117 | A1 | * | 6/2010 | Witte | ..................... B60L 3/108 |
| | | | | | 903/947 |
| 2012/0190499 | A1 | * | 7/2012 | Oba | ..................... B60W 30/192 |
| | | | | | 477/115 |
| 2019/0275994 | A1 | * | 9/2019 | Zhao | ......................... B60T 1/10 |
| 2020/0238995 | A1 | * | 7/2020 | Imamura | ........... B60W 30/1886 |

FOREIGN PATENT DOCUMENTS

| CN | 101522487 A | 9/2009 |
| CN | 106347360 A | 1/2017 |
| CN | 110239360 A | 9/2019 |
| JP | 2015-85794 A | 5/2015 |
| WO | WO 2011/042951 A1 | 4/2011 |

* cited by examiner

*Primary Examiner* — James J Lee
*Assistant Examiner* — Wenyuan Yang
(74) *Attorney, Agent, or Firm* — Oblon, McClelland, Maier & Neustadt, L.L.P.

(57) ABSTRACT

When regeneration control is performed while yaw rate control is being performed, the regeneration control is prohibited, or a regenerative torque of a second rotary machine based on the regeneration control is limited in comparison with a case in which the yaw rate control is not performed. Accordingly, since an influence of the regenerative torque controlled by the regeneration control on the yaw rate control can be suitably curbed, it is possible to curb deterioration in conformability of an actual yaw rate with a target yaw rate in the yaw rate control.

7 Claims, 7 Drawing Sheets

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

SIMULTANEOUS REGENERATIVE BRAKING AND YAW RATE CONTROL FOR A FOUR-WHEEL-DRIVE VEHICLE

CROSS-REFERENCE TO RELATED APPLICATION

This application claims priority to Japanese Patent Application No. 2020-015731 filed on Jan. 31, 2020, incorporated herein by reference in its entirety.

BACKGROUND

1. Technical Field

The present disclosure relates to a four-wheel-drive vehicle that can adjust a drive power distribution ratio of drive powers which are to be transmitted from a drive power source to main driving wheels and sub driving wheels.

2. Description of Related Art

A four-wheel-drive vehicle including (a) a rotary machine that serves as a drive power source, (b) a drive power distribution device that can transmit a drive power from the drive power source to main driving wheels and sub driving wheels and adjust a drive power distribution ratio of the drive power transmitted from the drive power source to the main driving wheels and the sub driving wheels, and (c) a control device that controls the drive power source is known well. An example thereof is a four-wheel-drive vehicle described in WO 2011/042951.

SUMMARY

In the four-wheel-drive vehicle described in WO 2011/042951, it is conceivable that regeneration control for performing regeneration using the rotary machine be performed at the time of deceleration or that yaw rate control for controlling the drive power distribution ratio or the like such that an actual yaw rate of the four-wheel-drive vehicle conforms to a target yaw rate be performed. However, when the regeneration control is performed while the yaw rate control is being performed, there is concern about deterioration in the conformability of the actual yaw rate with the target yaw rate due to a regenerative torque which is controlled by the regeneration control.

The present disclosure provides a four-wheel-drive vehicle that can curb deterioration in the conformability of an actual yaw rate with a target yaw rate.

According to a first aspect of the present disclosure, there is provided a four-wheel-drive vehicle (a) including: a rotary machine that is a drive power source; a drive power distribution device configured to transmit a drive power from the drive power source to main driving wheels and sub driving wheels and to adjust a drive power distribution ratio of the drive power which is transmitted from the drive power source to the main driving wheels and the sub driving wheels; and a control device configured to control the drive power source, (b) wherein when regeneration control for performing regeneration of the rotary machine at the time of deceleration and yaw rate control for controlling the drive power distribution ratio such that an actual yaw rate of the four-wheel-drive vehicle conforms to a target yaw rate are performed together, the control device is configured to prohibit the regeneration control or to limit a regenerative torque of the rotary machine based on the regeneration control in comparison with a case in which the yaw rate control is not performed.

A second aspect of the present disclosure provides the four-wheel-drive vehicle according to the first aspect, wherein (a) each of the main driving wheels and the sub driving wheels includes a wheel brake of which a braking force is able to be independently adjusted, and (b) the control device is configured to control the braking forces of the wheel brakes provided in the wheels such that insufficiency of a braking force of the four-wheel-drive vehicle due to the prohibiting of the regeneration control or the limiting of the regenerative torque based on the regeneration control in comparison with in a case in which the yaw rate control is not performed is compensated for.

A third aspect of the present disclosure provides the four-wheel-drive vehicle according to the first or second aspect, wherein (a) the regeneration control is to control the regenerative torque such that the regenerative torque reaches a required regenerative torque calculated from a driver's brake operation amount, and (b) the control device is configured to limit change of the regenerative torque when the yaw rate control is performed and the required regenerative torque increases.

A fourth aspect of the present disclosure provides the four-wheel-drive vehicle according to the third aspect, wherein the control device is configured to permit change of the regenerative torque when the yaw rate control is performed and the required regenerative torque decreases.

A fifth aspect of the present disclosure provides the four-wheel-drive vehicle according to the third or fourth aspect, wherein the control device is configured to perform ending control for changing the regenerative torque at a preset constant rate of change until the regenerative torque reaches the required regenerative torque when the yaw rate control ends.

A sixth aspect of the present disclosure provides the four-wheel-drive vehicle according to any one of the first to fifth aspects, wherein (a) each of the main driving wheels and the sub driving wheels includes a wheel brake of which a braking force is able to be independently adjusted, and (b) the control device is configured to control the braking forces of the wheel brakes and the drive power distribution ratio such that the actual yaw rate conforms to the target yaw rate.

With the four-wheel-drive vehicle according to the first aspect, when the regeneration control and the yaw rate control are performed together, the regeneration control is prohibited or a regenerative torque of the rotary machine based on the regeneration control is limited in comparison with a case in which the yaw rate control is not performed. Accordingly, since an influence of the regenerative torque controlled by the regeneration control on the yaw rate control can be suitably curbed, it is possible to curb deterioration in the conformability of the actual yaw rate with the target yaw rate in the yaw rate control.

With the four-wheel-drive vehicle according to the second aspect, since the braking forces of the wheel brakes provided in the wheels are controlled such that insufficiency of the braking force of the four-wheel-drive vehicle due to the prohibiting of the regeneration control or the limiting of the regenerative torque based on the regeneration control in comparison with a case in which the yaw rate control is not performed is compensated for, it is possible to curb insufficiency of the braking force of the four-wheel-drive vehicle using the braking forces of the wheel brakes and to curb deterioration in the conformability of the actual yaw rate with the target yaw rate.

With the four-wheel-drive vehicle according to the third aspect, when the yaw rate control and the regeneration control are performed together and the required regenerative torque increases, change of the regenerative torque is limited and thus it is possible to curb an influence of the regeneration control on the yaw rate control.

With the four-wheel-drive vehicle according to the fourth aspect, when the yaw rate control and the regeneration control are performed together and the required regenerative torque decreases, the regeneration control is permitted and thus it is possible to appropriately make the yaw rate control and the regeneration control be compatible with each other.

With the four-wheel-drive vehicle according to the fifth aspect, since ending control for changing the regenerative torque at a preset constant rate of change until the regenerative torque reaches the required regenerative torque is performed when the yaw rate control ends, it is possible to appropriately curb change of the regenerative torque changing per unit time after the yaw rate control has ended.

With the four-wheel-drive vehicle according to the sixth aspect, since the braking forces of the wheel brakes and the drive power distribution ratio are controlled such that the actual yaw rate conforms to the target yaw rate in the yaw rate control, it is possible to appropriately make the actual yaw rate conform the target yaw rate.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the accompanying drawings.

Figure 1:
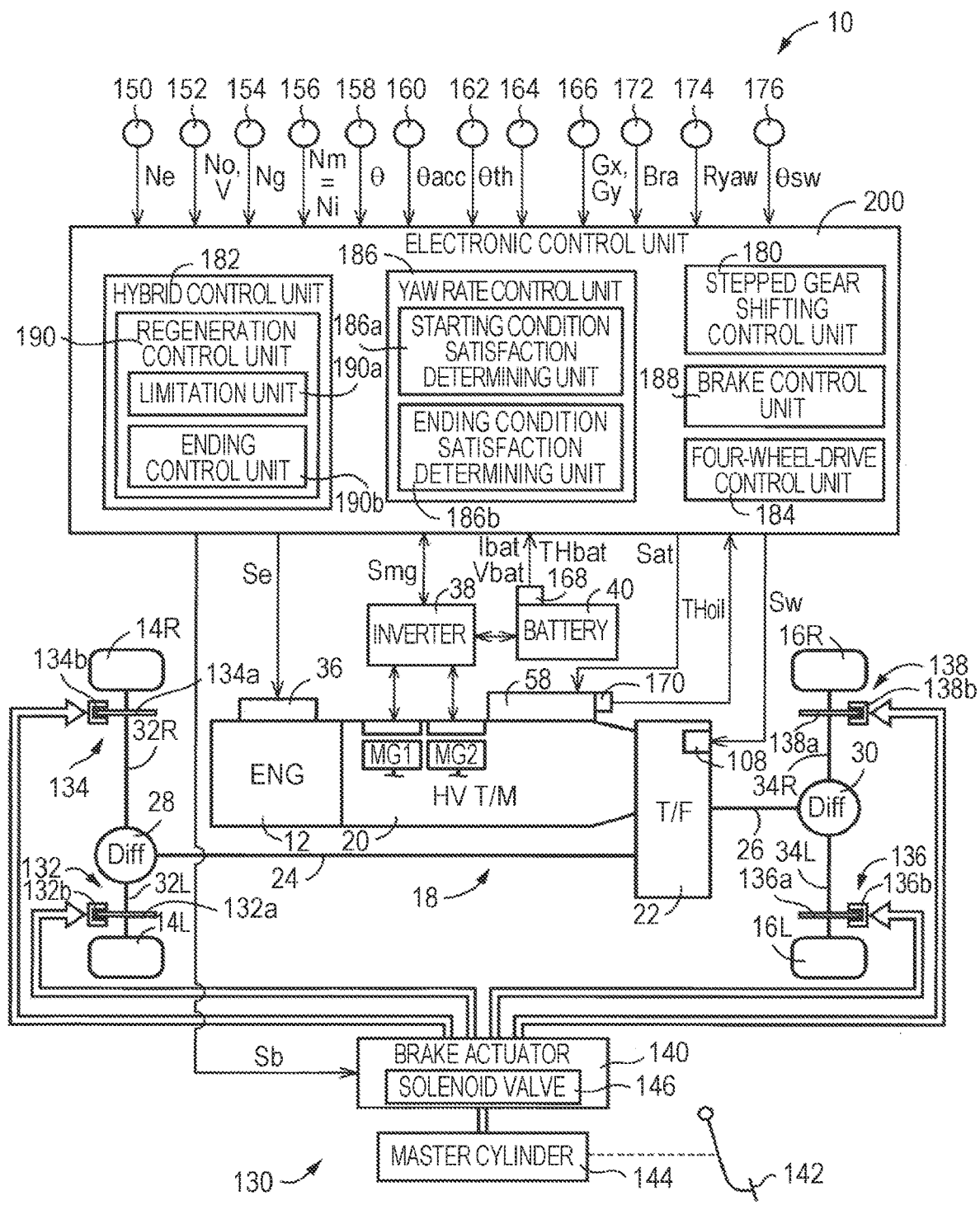
FIG. 1 is a diagram schematically illustrating a configuration of a four-wheel-drive vehicle according to the present disclosure and schematically illustrating a control system including an electronic control unit controlling the four-wheel-drive vehicle.

FIG. 1 is a diagram schematically illustrating a configuration of a four-wheel-drive vehicle 10 according to the present disclosure and schematically illustrating a control system including an electronic control unit (control device) 200 that controls the four-wheel-drive vehicle 10. As illustrated in FIG. 1, the four-wheel-drive vehicle 10 includes an engine (drive power source) 12 which is a main drive power source, a pair of front wheels 14R and 14L on the right and left sides, a pair of rear wheels 16R and 16L on the right and left sides, and a power transmission device 18 that transmits a drive power from the engine 12 to the front wheels 14R and 14L and the rear wheels 16R and 16L. The rear wheels 16R and 16L (which are referred to as rear wheels 16 when they are not particularly distinguished) are main driving wheels which both serve as driving wheels in two-wheel-drive travel and four-wheel-drive travel. The front wheels 14R and 14L (which are referred to as front wheels 14 when they are not particularly distinguished) are sub driving wheels which serve as driven wheels in two-wheel-drive travel and serve as driving wheels in four-wheel-drive travel. The four-wheel-drive vehicle 10 is a four-wheel-drive vehicle with a front-engine rear-drive (FR) type as a base. The rear wheels 16 correspond to main driving wheels in the claims and the front wheels 14 correspond to sub driving wheels in the claims.

The power transmission device 18 includes a hybrid transmission 20 including a first rotary machine (a drive power source) MG1 and a second rotary machine (a drive power source) MG2 which will be described later, a transfer (a drive power distribution device) 22, a front propeller shaft 24, a rear propeller shaft 26, a front-wheel differential gear unit 28, a rear-wheel differential gear unit 30, a pair of front-wheel axles 32R and 32L on the right and left sides, and a pair of rear-wheel axles 34R and 34L on the right and left sides. In the power transmission device 18, a drive power from the engine 12 transmitted via the transmission 20 is transmitted from the transfer 22 to the rear wheels 16 sequentially via the rear propeller shaft 26, the rear-wheel differential gear unit 30, the rear-wheel axles 34R and 34L, and the like. In the power transmission device 18, when some of the drive power from the engine 12 transmitted to the transfer 22 is distributed to the front wheels 14 side, the distributed drive power is transmitted to the front wheels 14 sequentially via the front propeller shaft 24, the front-wheel differential gear unit 28, the front-wheel axles 32R and 32L, and the like.

Figures 2, 3:
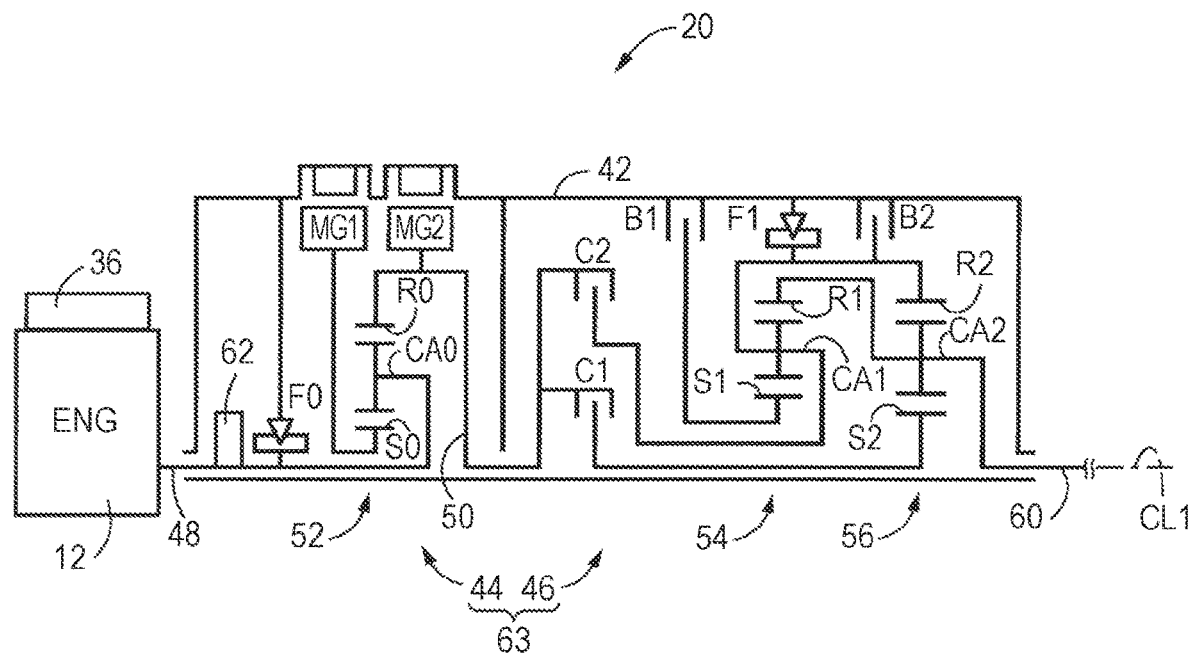
FIG. 2 is a skeleton diagram schematically illustrating a configuration of a transmission illustrated in FIG. 1.
FIG. 3 is an engagement operation table of the transmission illustrated in FIG. 2.

FIG. 2 is a skeleton diagram schematically illustrating the configuration of the transmission 20. In the engine 12, an engine torque Te which is an output torque of the engine 12 is controlled by causing an electronic control unit 200 which will be described later to control an engine control device 36 (see FIG. 1) including an electronic throttle valve, a fuel injection device, and an ignition device.

The transmission 20 includes a first rotary machine MG1 and a second rotary machine MG2. The first rotary machine MG1 and the second rotary machine MG2 are electric rotary machines having a function of an electric motor (a motor) and a function of a power generator (a generator) and are so-called motor generators. The first rotary machine MG1 and the second rotary machine MG2 can be used as a drive power source for travel of the four-wheel-drive vehicle 10. The first rotary machine MG1 and the second rotary machine MG2 are connected to a battery 40 (see FIG. 1) provided in the four-wheel-drive vehicle 10 via an inverter 38 (see FIG. 1) provided in the four-wheel-drive vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 200 to control the inverter 38. For example, in the case of positive rotation, an output torque of a rotary machine serves as a powering torque at a positive torque which is an acceleration side and serves as a regenerative torque at a negative torque which is a deceleration side. The battery 40 is a power storage device that transmits and receives electric power to and from the first rotary machine MG1 and the second rotary machine MG2. The first rotary machine MG1 and the second rotary machine MG2 are provided in a case 42 which is a non-rotary member attached to a vehicle body. The first rotary machine MG1 and the second rotary machine MG2 correspond to a drive power source in the claims.

The transmission 20 includes an electrical stepless transmission 44 and a mechanical stepped transmission 46 which are arranged in series on a first common rotation axis CL1 in the case 42 which is a non-rotary member attached to the vehicle body. The electrical stepless transmission 44 is provided in a power transmission path between the engine 12 and the mechanical stepped transmission 46. The electrical stepless transmission 44 is connected to the engine 12 directly or indirectly via a damper or the like which is not illustrated. The mechanical stepped transmission 46 is provided in a power transmission path between the electrical stepless transmission 44 and the transfer 22. The mechanical stepped transmission 46 is connected to an output side of the electrical stepless transmission 44. In the transmission 20, power which is output from the engine 12 or the second rotary machine MG2 is transmitted to the mechanical stepped transmission 46 and is transmitted from the mechanical stepped transmission 46 to the transfer 22. In the following description, the electrical stepless transmission 44 is referred to as a stepless transmission 44 and the mechanical stepped transmission 46 is referred to as a stepped transmission 46. Power is synonymous with a torque or a force when they are not particularly distinguished. The stepless transmission 44 and the stepped transmission 46 are disposed to be substantially symmetric with respect to the first rotation axis CL1, and a lower half with respect to the first rotation axis CL1 is not illustrated in FIG. 2.

The stepless transmission 44 includes the first rotary machine MG1 and a differential gear mechanism 52 which is a power split mechanism that mechanically splits power of the engine 12 to the first rotary machine MG1 and an intermediate transmission member 50 which is an output rotary member of the stepless transmission 44. The second rotary machine MG2 is connected to the intermediate transmission member 50 in a power-transmittable manner. The first rotary machine MG1 is a rotary machine to which power of the engine 12 is transmitted. The stepless transmission 44 is an electrical stepless transmission in which a differential state of the differential gear mechanism 52 is controlled by controlling the operating state of the first rotary machine MG1. The stepless transmission 44 operates as an electrical stepless transmission in which a gear ratio $\gamma 0$ (=Ne/Nm) which is a value of a ratio of an engine rotation speed Ne having the same value as a rotation speed of a connecting shaft 48 serving as an input rotary member to an MG2 rotation speed Nm which is a rotation speed of the intermediate transmission member 50 serving as an output rotary member changes. The first rotary machine MG1 is a rotary machine that can control the engine rotation speed Ne which is a rotation speed of the engine 12. Controlling the operating state of the first rotary machine MG1 corresponds to performing operation control of the first rotary machine MG1.

The differential gear mechanism 52 is constituted by a single-pinion type planetary gear unit and includes a sun gear S0, a carrier CA0, and a ring gear R0. The engine 12 is connected to the carrier CA0 via the connecting shaft 48 in a power-transmittable manner, the first rotary machine MG1 is connected to the sun gear S0 in a power-transmittable manner, and the second rotary machine MG2 is connected to the ring gear R0 in a power-transmittable manner. In the differential gear mechanism 52, the carrier CA0 serves as an input element, the sun gear S0 serves as a reaction element, and the ring gear R0 serves as an output element.

The stepped transmission 46 is an automatic transmission constituting a power transmission path between the intermediate transmission member 50 and the transfer 22 and is an automatic transmission constituting a part of a power transmission path between the engine 12, the first rotary machine MG1, and the second rotary machine MG2 which are drive power sources for travel and the drive wheels (14, 16). The intermediate transmission member 50 also serves as an input rotary member of the stepped transmission 46. The second rotary machine MG2 is connected to the intermediate transmission member 50 to rotate together therewith. For example, the stepped transmission 46 is a known planetary gear type automatic transmission including a plurality of planetary gear units such as a first planetary gear unit 54 and a second planetary gear unit 56 and a plurality of engagement devices such as a clutch C1, a clutch C2, a brake B1, and a brake B2 in addition to a one-way clutch F1. In the following description, the clutch C1, the clutch C2, the brake B1, and the brake B2 are simply referred to as engagement devices CB when they are not particularly distinguished.

Each engagement device CB is a hydraulic frictional engagement device which is constituted by a multi-disc or single-disc clutch or brake which is pressed by a hydraulic actuator, a band brake which is tightened by a hydraulic actuator, and the like. An operating state such as an engaged state or a disengaged state of each engagement device CB is switched by adjusted hydraulic pressures of the engagement device CB which are output from a hydraulic pressure control circuit 58 (see FIG. 1) provided in the four-wheel-drive vehicle 10.

In the stepped transmission 46, rotary elements of the first planetary gear unit 54 and the second planetary gear unit 56 are connected to each other directly or indirectly via the engagement devices CB or the one-way clutch F1 or are connected to the intermediate transmission member 50, the case 42, or the output shaft 60. The rotary elements of the first planetary gear unit 54 are a sun gear S1, a carrier CA1, and a ring gear R1 and the rotary elements of the second planetary gear unit 56 are a sun gear S2, a carrier CA2, and a ring gear R2.

The stepped transmission 46 is a stepped transmission in which one gear stage out of a plurality of gear stages (also referred to as gear shifting stages) with different gear shifting ratios (also referred to as a gear ratio) $\gamma$at (=input rotation speed Ni/output rotation speed No) is formed, for example, by engagement of any two engagement devices out of a plurality of engagement devices. That is, a gear stage in the stepped transmission 46 is switched, that is, gear shifting is performed, by selectively engaging a plurality of engagement devices. The stepped transmission 46 is a stepped automatic transmission in which a plurality of gear stages is alternatively formed. In this embodiment, a gear stage which is formed in the stepped transmission 46 is referred to as an AT gear stage. The input rotation speed Ni is an input rotation speed of the stepped transmission 46 which is a rotation speed of an input rotary member of the stepped transmission 46 and has the same value as the rotation speed of the intermediate transmission member 50 and the same value as the MG2 rotation speed Nm which is the rotation speed of the second rotary machine MG2. The input rotation speed Ni can be expressed by the MG2 rotation speed Nm. The output rotation speed No is a rotation speed of the output shaft 60 which is an output rotation speed of the stepped transmission 46 and is also an output rotation speed of a combined transmission 20 of the stepless transmission 44 and the stepped transmission 46.

In the stepped transmission 46, for example, as illustrated in an engagement operation table of FIG. 3, four forward AT gear stages including a first AT gear stage ("1$^{st}$" in the drawing) to a fourth AT gear stage ("4$^{th}$" in the drawing) are formed as the plurality of AT gear stages. The gear ratio γat of the first AT gear stage is the highest and the gear ratio γat becomes lower in higher AT gear stages. A reverse AT gear stage ("Rev" in the drawing) is formed, for example, by engagement of the clutch C1 and engagement of the brake B2. That is, for example, the first AT gear stage is formed at the time of reverse travel. The engagement operation table illustrated in FIG. 3 is obtained by collecting relationships between the AT gear stages and the operation states of the plurality of engagement devices. That is, the engagement operation table illustrated in FIG. 3 is obtained by collecting relationships between the AT gear stages and predetermined engagement devices which are engagement devices engaged in the corresponding AT gear stages. In FIG. 3, "0" denotes engagement, "A" denotes engagement at the time of engine braking or at the time of coasting downshift of the stepped transmission 46, and a blank denotes disengagement.

In the stepped transmission 46, an AT gear stage which is formed according to a driver's operation of an accelerator, a vehicle speed V, or the like is switched, that is, a plurality of AT gear stages is selectively formed, by the electronic control unit 200 which will be described later. For example, in gear shifting control of the stepped transmission 46, so-called clutch-to-clutch gear shifting in which gear shifting is performed by disengagement of disengagement-side engagement devices CB and engagement of engagement-side engagement devices CB is performed.

The four-wheel-drive vehicle 10 further includes, for example, a one-way clutch F0, an MOP 62 which is a mechanical oil pump, and an electric oil pump which is not illustrated.

The one-way clutch F0 is a lock mechanism that can fix the carrier CA0 such that it cannot rotate. That is, the one-way clutch F0 is a lock mechanism that can fix the connecting shaft 48 which is connected to a crankshaft of the engine 12 and which rotates integrally with the carrier CA0 to the case 42. The one-way clutch F0 idles in a positive rotating direction which is a rotating direction at the time of operation of the engine 12 and is automatically mechanically engaged in a rotating direction which is opposite to that at the time of operation of the engine 12. Accordingly, at the time of idling of the one-way clutch F0, the engine 12 is rotatable relative to the case 42. On the other hand, at the time of engagement of the one-way clutch F0, the engine 12 is not rotatable relative to the case 42. That is, the engine 12 is fixed to the case 42 by engagement of the one-way clutch F0. In this way, the one-way clutch F0 permits rotation in the positive rotating direction of the carrier CA0 which is a rotating direction at the time of operation of the engine 12 and prohibits rotation in the negative rotating direction of the carrier CA0. That is, the one-way clutch F0 is a lock mechanism that can permit rotation in the positive rotating direction of the engine 12 and prohibit rotation in the negative rotating direction.

The MOP 62 is connected to the connecting shaft 48, and rotates with rotation of the engine 12 to eject a hydraulic oil OIL which is used for the power transmission device 18. The electric oil pump which is not illustrated is driven when the engine 12 is stopped, that is, when the MOP 62 is not driven. The hydraulic oil OIL which is ejected by the MOP 62 or the electric oil pump which is not illustrated is supplied as a source pressure to the hydraulic pressure control circuit 58. The operation states of the engagement devices CB are switched by the hydraulic pressures adjusted by the hydraulic pressure control circuit 58 based on the source pressure.

Figure 4:
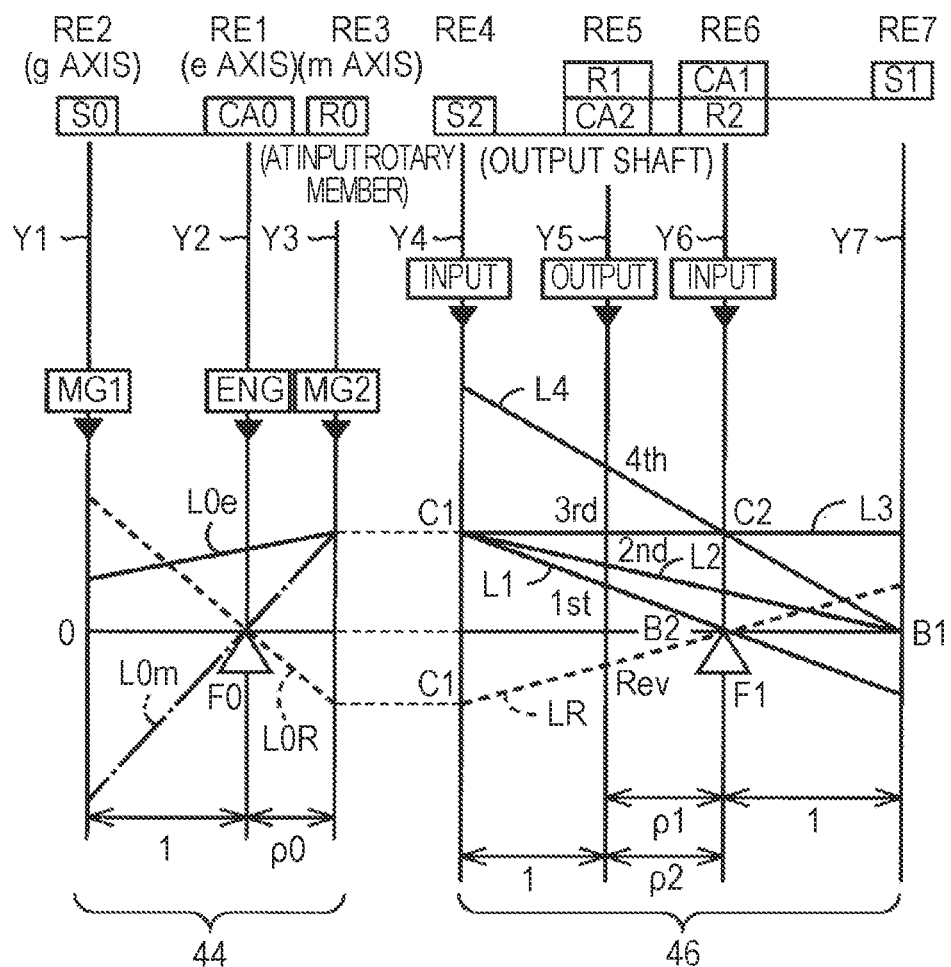
FIG. 4 is a collinear diagram illustrating a relative relationship between rotation speeds of rotary elements in a stepless transmission and a stepped transmission illustrated in FIG. 2.

FIG. 4 is a collinear diagram illustrating a relative relationship between rotation speeds of the rotary elements in the stepless transmission 44 and the stepped transmission 46. In FIG. 4, three vertical lines Y1, Y2, and Y3 corresponding to three rotary elements of the differential gear mechanism 52 constituting the stepless transmission 44 are a g axis indicating the rotation speed of the sun gear S0 corresponding to a second rotary element RE2, an e axis indicating the rotation speed of the carrier CA0 corresponding to a first rotary element RE1, and an m axis indicating the rotation speed of the ring gear R0 (that is, the input rotation speed of the stepped transmission 46) corresponding to a third rotary element RE3, respectively, sequentially from the left. Four vertical lines Y4, Y5, Y6, and Y7 of the stepped transmission 46 are axes indicating the rotation speed of the sun gear S2 corresponding to a fourth rotary element RE4, the rotation speed of the ring gear R1 and the carrier CA2 (that is, the rotation speed of the output shaft 60) connected to each other and corresponding to a fifth rotary element RE5, the rotation speed of the carrier CA1 and the ring gear R2 connected to each other and corresponding to a sixth rotary element RE6, and the rotation speed of the sun gear S1 corresponding to a seventh rotary element RE7, respectively, sequentially from the left. The gaps between the vertical lines Y1, Y2, and Y3 are determined according to a gear ratio ρ0 of the differential gear mechanism 52. The gaps between the vertical lines Y4, Y5, Y6, and Y7 are determined according to gear ratios ρ1 and ρ2 of the first and second planetary gear units 54 and 56. In the relationship between the vertical axes in the collinear diagram, when a gap between a sun gear and a carrier corresponds to "1," a gap between the carrier and a ring gear corresponds to a gear ratio ρ of a planetary gear unit (=number of teeth of sun gear/number of teeth of ring gear).

With reference to the collinear diagram illustrated in FIG. 4, in the differential gear mechanism 52 of the stepless transmission 44, the engine 12 (see "ENG" in the drawing) is connected to the first rotary element RE1, the first rotary machine MG1 (see "MG1" in the drawing) is connected to the second rotary element RE2, the second rotary machine MG2 (see "MG2" in the drawing) is connected to the third rotary element RE3 which rotates integrally with the intermediate transmission member 50, and the rotation of the engine 12 is transmitted to the stepped transmission 46 via the intermediate transmission member 50. In the stepless transmission 44, a relationship between the rotation speed of the sun gear S0 and the rotation speed of the ring gear R0 is represented by straight lines L0e, L0m, and L0R crossing the vertical line Y2.

In the stepped transmission 46, the fourth rotary element RE4 is selectively connected to the intermediate transmission member 50 via the clutch C1, the fifth rotary element RE5 is connected to the output shaft 60, the sixth rotary element RE6 is selectively connected to the intermediate transmission member 50 via the clutch C2 and selectively connected to the case 42 via the brake B2, and the seventh rotary element RE7 is selectively connected to the case 42 via the brake B1. In the stepped transmission 46, the rotation speeds at "1st," "2nd," "3rd," "4th," and "Rev" in the output shaft 60 are denoted by straight lines L1, L2, L3, L4, and LR crossing the vertical line Y5 through engagement/disengagement control of the engagement devices CB.

The straight line L0e and the straight lines L1, L2, L3, and L4 which are indicated by solid lines in FIG. 4 denote relative speeds of the rotary elements at the time of forward travel in a hybrid travel (=HV travel) mode in which HV travel using at least the engine 12 as a drive power source is possible. In the HV travel mode, in the differential gear mechanism 52, when an MG1 torque Tg serving as a reaction torque is input to the sun gear S0 as a negative torque of the first rotary machine MG1 with respect to an engine torque Te which is a positive torque input to the carrier CA0, a direct engine-transmitted torque Td (=Te/(1+ρ0)=−(1/ρ0)×Tg) which is a positive torque at the time of positive rotation appears in the ring gear R0. A combined torque of the direct engine-transmitted torque Td and the MG2 torque Tm is transmitted as a drive torque in the forward direction of the four-wheel-drive vehicle 10 to the transfer 22 via the stepped transmission 46 in which one AT gear stage out of the first AT gear stage to the fourth AT gear stage is formed according to a required drive power. The first rotary machine MG1 serves as a power generator when a negative torque is generated at the time of positive rotation. A generated electric power Wg of the first rotary machine MG1 charges the battery 40 or is consumed in the second rotary machine MG2. The second rotary machine MG2 outputs the MG2 torque Tm using all or some of the generated electric power Wg or electric power from the battery 40 in addition to the generated electric power Wg.

The straight line L0m indicated by an alternate long and short dash line in FIG. 4 and the straight lines L1, L2, L3, and L4 indicated by solid lines in FIG. 4 denote relative speeds of the rotary elements at the time of forward travel in a motor-driven travel (=EV travel) mode in which EV travel using at least one rotary machine of the first rotary machine MG1 and the second rotary machine MG2 as a drive power source in a state in which the operation of the engine 12 is stopped is possible. The EV travel at the time of forward travel in the EV travel mode includes, for example, single-motor-driven EV travel using only the second rotary machine MG2 as a drive power source and two-motor-driven travel using both the first rotary machine MG1 and the second rotary machine MG2 as drive power sources. In the single-motor-driven EV travel, the carrier CA0 does not rotate and the MG2 torque Tm which is a positive torque at the time of positive rotation is input to the ring gear R0. At this time, the first rotary machine MG1 connected to the sun gear S0 enters a no-load state and idles at the time of negative rotation. In the single-motor-driven EV travel, the one-way clutch F0 is disengaged and the connecting shaft 48 is not fixed to the case 42.

In the two-motor-driven EV travel, when the MG1 torque Tg which is a negative torque at the time of negative rotation is input to the sun gear S0 in a state in which the carrier CA0 does not rotate, the one-way clutch F0 is automatically engaged such that rotation in the negative rotating direction of the carrier CA0 is prohibited. In the state in which the carrier CA0 is fixed not to be rotatable by engagement of the one-way clutch F0, a reaction torque based on the MG1 torque Tg is input to the ring gear R0. In the two-motor-driven EV travel, similarly to the single-motor-driven EV travel, the MG2 torque Tm is input to the ring gear R0. When the MG1 torque Tg which is a negative torque at the time of negative rotation is input to the sun gear S0 in a state in which the carrier CA0 does not rotate and the MG2 torque Tm is not input thereto, the single-motor-driven EV travel using the MG1 torque Tg is also possible. At the time of forward travel in the EV travel mode, the engine 12 is not driven, the engine rotation speed Ne is zero, and at least one torque of the MG1 torque Tg and the MG2 torque Tm is transmitted as a drive torque in the forward direction of the four-wheel-drive vehicle 10 to the driving wheels (the front wheels 14, the rear wheels 16) via the stepped transmission 46 in which one AT gear stage out of the first to fourth AT gear stages is formed. At the time of forward travel in the EV travel mode, the MG1 torque Tg is a powering torque which is a negative torque at the time of negative rotation and the MG2 torque Tm is a powering torque which is a positive torque at the time of positive rotation.

The straight line L0R and the straight line LR indicated by dotted lines in FIG. 4 denote relative speeds of the rotary elements at the time of reverse travel in the EV travel mode. At the time of reverse travel in the EV travel mode, the MG2 torque Tm which is a negative torque at the time of negative rotation is input to the ring gear R0 and the MG2 torque Tm is transmitted as a drive torque in the reverse travel direction of the four-wheel-drive vehicle 10 to the driving wheels (the front wheels 14, the rear wheels 16) via the stepped transmission 46 in which the first AT gear stage is formed. In the four-wheel-drive vehicle 10, by outputting the MG2 torque Tm for reverse travel of which the sign is opposite to that of the MG2 torque Tm for forward travel at the time of forward travel from the second rotary machine MG2, for example, in a state in which the first AT gear stage which is a low-side AT gear stage for forward travel out of a plurality of AT gear stages is formed by the electronic control unit 200, it is possible to perform reverse travel. At the time of reverse travel in the EV travel mode, the MG2 torque Tm is a powering torque which is a negative torque at the time of negative rotation. In the HV travel mode, since the second rotary machine MG2 can be negatively rotated as indicated by the straight line L0R, it is possible to perform reverse travel similarly to the EV travel mode.

Figure 5:
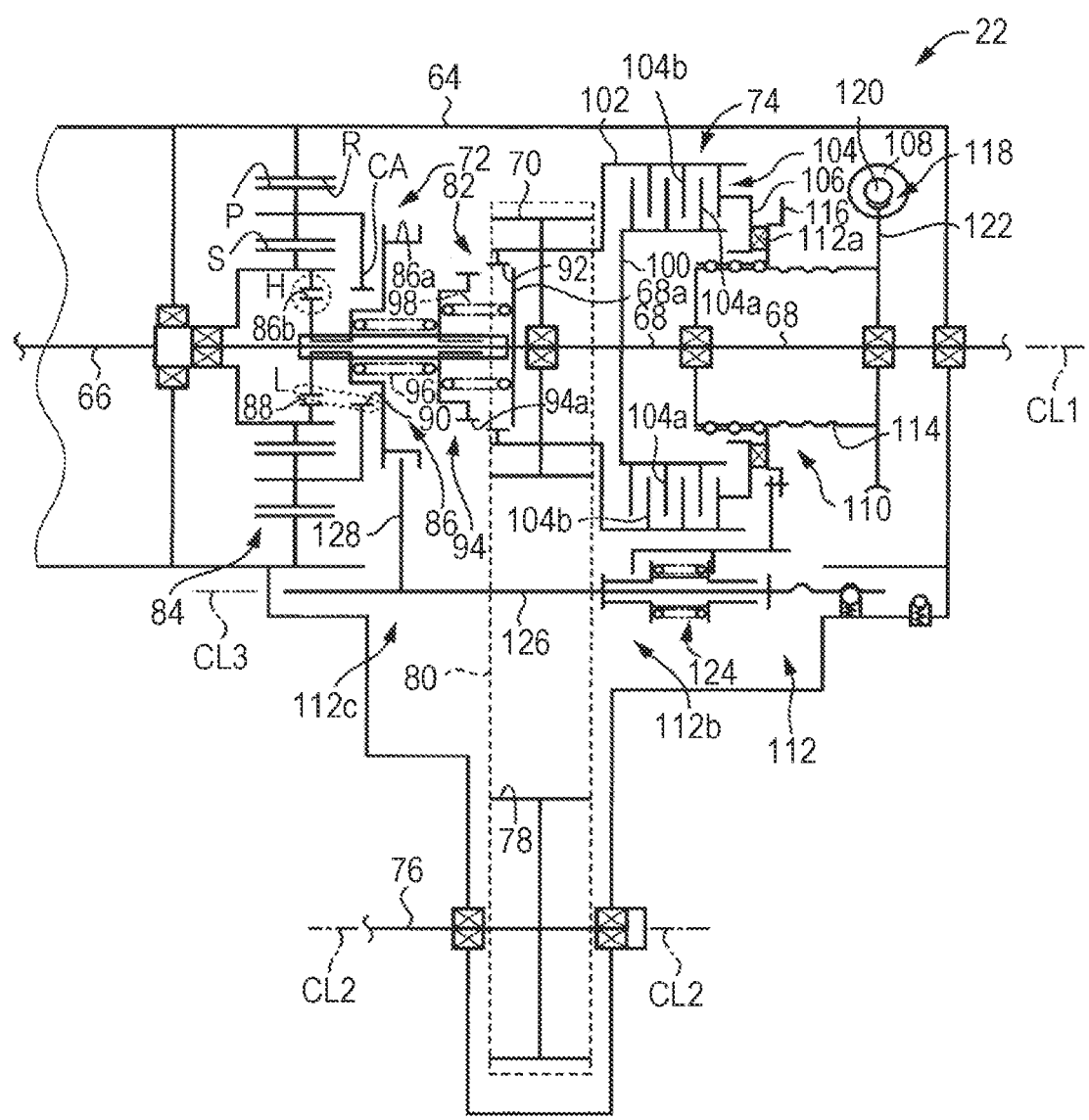
FIG. 5 is a skeleton diagram illustrating a structure of a transfer illustrated in FIG. 1.

The transfer 22 will be described below. FIG. 5 is a skeleton diagram illustrating the structure of the transfer 22. The transfer 22 includes a transfer case 64 which is a non-rotary member. As illustrated in FIG. 5, the transfer 22 includes an input shaft 66, a rear-wheel output shaft 68, a front-wheel-driving drive sprocket 70, a high-low switching mechanism 72, and a front-wheel-driving clutch 74 around the common first rotation axis CL1 in the transfer case 64. The input shaft 66 is connected to the engine 12 via the transmission 20 in a power-transmittable manner. The rear-wheel output shaft 68 is connected to the rear propeller shaft 26 in a power-transmittable manner, and the rear-wheel output shaft 68 outputs a drive power transmitted from the engine 12 to the input shaft 66 via the transmission 20 to the rear wheels 16. The front-wheel-driving drive sprocket 70 is supported by the rear-wheel output shaft 68 such that it is rotatable relative to the rear-wheel output shaft 68. The high-low switching mechanism 72 serves as a sub transmission that changes rotation of the input shaft 66 and transmits the changed rotation to the rear-wheel output shaft 68. The front-wheel-driving clutch 74 is a multi-disc wet clutch and the front-wheel-driving clutch 74 transmits a part of the drive power transmitted to the rear-wheel output shaft 68 to the front-wheel-driving drive sprocket 70, that is, adjusts a transmission torque which is transmitted from the rear-wheel output shaft 68 to the front-wheel-driving drive sprocket 70.

As illustrated in FIG. 5, the transfer 22 includes a front-wheel output shaft 76 and a front-wheel-driving driven sprocket 78 around a common second rotation axis CL2 in the transfer case 64. The transfer 22 further includes a front-wheel-driving chain 80 and a differential lock mechanism 82. The front-wheel output shaft 76 is connected to the front propeller shaft 24 in a power-transmittable manner. The front-wheel-driving driven sprocket 78 is provided integrally with the front-wheel output shaft 76. The front-wheel-driving chain 80 is suspended on the front-wheel-driving drive sprocket 70 and the front-wheel-driving driven sprocket 78 and connects the front-wheel-driving drive sprocket 70 and the front-wheel-driving driven sprocket 78 in a power-transmittable manner. The differential lock mechanism 82 is a dog clutch that selectively connects the rear-wheel output shaft 68 and the front-wheel-driving drive sprocket 70. The differential lock mechanism 82 selectively switches between a differential state in which differential rotation between the rear propeller shaft 26 and the front propeller shaft 24 is not limited and a non-differential state in which the differential rotation therebetween is limited.

As illustrated in FIG. 5, the high-low switching mechanism 72 includes a single pinion type planetary gear unit 84 and a high-low sleeve 86. The planetary gear unit 84 includes a sun gear S that is connected to the input shaft 66 in a power-transmittable manner, a ring gear R that is connected to the transfer case 64 such that it is not rotatable around the first rotation axis CL1, and a carrier CA that supports a plurality of pinion gears P engaging with the sun gear S and the ring gear R such that they can rotate on their own axes and revolve around the first rotation axis CL1. Accordingly, in the high-low switching mechanism 72, a rotation speed of the sun gear S is equal to that of the input shaft 66 and a rotation speed of the carrier CA is lower than that of the input shaft 66. As illustrated in FIG. 5, high-side gear teeth 88 are formed on an inner circumferential surface of the sun gear S, and low-side gear teeth 90 with the same diameter as the high-side gear teeth 88 are formed in the carrier CA.

The high-low sleeve 86 is spline-fitted to the rear-wheel output shaft 68 such that it is movable in the direction of the first rotation axis CL1 relative to the rear-wheel output shaft 68 and is not rotatable relative to the rear-wheel output shaft 68. As illustrated in FIG. 5, the high-low sleeve 86 includes a fork connecting portion 86a and outer circumferential teeth 86b engaging with the high-side gear teeth 88 and the low-side gear teeth 90 which are integrally provided. In the high-low switching mechanism 72, when the high-low sleeve 86 moves in the direction of the first rotation axis CL1 relative to the rear-wheel output shaft 68 and the outer circumferential teeth 86b of the high-low sleeve 86 engage with the high-side gear teeth 88, a high-speed gear stage H in which rotation of the same speed as the rotation of the input shaft 66 is transmitted to the rear-wheel output shaft 68 is formed. In the high-low switching mechanism 72, when the high-low sleeve 86 moves in the direction of the first rotation axis CL1 relative to the rear-wheel output shaft 68 and the outer circumferential teeth 86b of the high-low sleeve 86 engage with the low-side gear teeth 90, a low-speed gear stage L in which rotation of a speed lower than the rotation speed of the input shaft 66 is transmitted to the rear-wheel output shaft 68 is formed.

As illustrated in FIG. 5, the differential lock mechanism 82 includes lock teeth 92 and a lock sleeve 94. The lock teeth 92 are integrally formed on the inner circumferential surface of the front-wheel-driving drive sprocket 70. The lock sleeve 94 is spline-fitted to the rear-wheel output shaft 68 such that it is movable in the direction of the first rotation axis CL1 relative to the rear-wheel output shaft 68 and is not rotatable relative to the rear-wheel output shaft 68. Outer circumferential teeth 94a engaging with the lock teeth 92 are formed in the lock sleeve 94. Accordingly, in the differential lock mechanism 82, when the lock sleeve 94 moves in the direction of the first rotation axis CL1 relative to the rear-wheel output shaft 68 and the outer circumferential teeth 94a of the lock sleeve 94 engage with the lock teeth 92, the rear-wheel output shaft 68 and the front-wheel-driving drive sprocket 70 rotate together.

As illustrated in FIG. 5, the transfer 22 includes a coil-shaped first spring 96 and a coil-shaped second spring 98. The first spring 96 is provided in a compressed state between the high-low sleeve 86 and the lock sleeve 94. The first spring 96 biases the high-low sleeve 86 and the lock sleeve 94 in a direction in which they are separated from each other. The second spring 98 is provided in a compressed state between a protruding portion 68a formed in the rear-wheel output shaft 68 and the lock sleeve 94. The second spring 98 biases the lock sleeve 94 in a direction in which it is separated from the lock teeth 92. In the transfer 22, when the outer circumferential teeth 86b of the high-low sleeve 86 engage with the low-side gear teeth 90, the lock sleeve 94 moves against a biasing force of the second spring 98 in a direction in which it approaches the lock teeth 92 with a biasing force of the first spring 96 and the outer circumferential teeth 94a of the lock sleeve 94 engage with the lock teeth 92. In the transfer 22, when the outer circumferential teeth 86b of the high-low sleeve 86 engage with the high-side gear teeth 88, the lock sleeve 94 moves against the biasing force of the first spring 96 in a direction in which it is separated from the lock teeth 92 with the biasing force of the second spring 98 and the outer circumferential teeth 94a of the lock sleeve 94 are separated from the lock teeth 92.

As illustrated in FIG. 5, the front-wheel-driving clutch 74 includes a clutch hub 100, a clutch drum 102, a frictional engagement element 104, and a piston 106. The clutch hub 100 is connected to the rear-wheel output shaft 68 in a power-transmittable manner. The clutch drum 102 is connected to the front-wheel-driving drive sprocket 70 in a power-transmittable manner. The frictional engagement element 104 includes a first frictional plate 104a and a second frictional plate 104b. The first frictional plate 104a is provided on the outer circumference side of the clutch hub 100 such that it is movable in the direction of the first rotation axis CL1 relative to the clutch hub 100 and is not rotatable around the first rotation axis CL1 relative to the clutch hub 100. The second frictional plate 104b is provided on the inner circumference side of the clutch drum 102 such that it is movable in the direction of the first rotation axis CL1 relative to the clutch drum 102 and is not rotatable around the first rotation axis CL1 relative to the clutch drum 102. The piston 106 comes into contact with the frictional engagement element 104 and presses the first frictional plate 104a and the second frictional plate 104b.

As illustrated in FIG. 5, the transfer 22 includes an electric motor 108, a screw mechanism 110 that converts a rotational motion of a motor shaft (not illustrated) of the electric motor 108 to a translational motion, and a transmission mechanism 112 that transmits a translational force in the screw mechanism 110 to the high-low switching mechanism 72, the front-wheel-driving clutch 74, and the differential lock mechanism 82 as devices that operate the high-low switching mechanism 72, the front-wheel-driving clutch 74, and the differential lock mechanism 82.

As illustrated in FIG. 5, the screw mechanism 110 is provided on the first rotation axis CL1 which is the same axis as the rear-wheel output shaft 68. The screw mechanism 110 includes a screw shaft member 114 and a nut member 116. The screw shaft member 114 is connected to the electric motor 108 via a worm gear 118. The screw shaft member 114 is supported by the rear-wheel output shaft 68 such that it is rotatable around the first rotation axis CL1 relative to the rear-wheel output shaft 68. The nut member 116 is screwed to the screw shaft member 114 such that it is movable in the direction of the first rotation axis CL1 relative to the screw shaft member 114 with rotation of the screw shaft member 114 around the first rotation axis CL1. The worm gear 118 is a gear pair including a worm 120 that is integrally formed in the motor shaft of the electric motor 108 and a worm wheel 122 that is formed integrally in the screw shaft member 114. By employing this configuration, the screw mechanism 110 converts a rotational motion from the electric motor 108 transmitted to the screw shaft member 114 via the worm gear 118 to a translational motion in which the nut member 116 moves in the direction of the first rotation axis CL1.

As illustrated in FIG. 5, the transmission mechanism 112 includes a first transmission mechanism 112a, a second transmission mechanism 112b, and a third transmission mechanism 112c. The first transmission mechanism 112a transmits a force with which the nut member 116 moves linearly in the direction of the first rotation axis CL1 in the screw mechanism 110 to the piston 106 of the front-wheel-driving clutch 74. The first transmission mechanism 112a is a bearing that is provided between the piston 106 of the front-wheel-driving clutch 74 and the nut member 116. The second transmission mechanism 112b transmits a force with which the nut member 116 moves linearly in the direction of the first rotation axis CL1 in the screw mechanism 110 to the high-low sleeve 86 of the high-low switching mechanism 72. The second transmission mechanism 112b includes a connection mechanism 124, a fork shaft 126, and a fork 128. The connection mechanism 124 connects the nut member 116 of the screw mechanism 110 and the fork shaft 126 in a power-transmittable manner. The fork shaft 126 is provided in the transfer case 64 such that it is movable in a direction of a third rotation axis CL3 parallel to the first rotation axis CL1 relative to the transfer case 64. The fork 128 is connected to the fork shaft 126 and the fork connecting portion 86a of the high-low sleeve 86. The third transmission mechanism 112c transmits a force with which the nut member 116 moves linearly in the direction of the first rotation axis CL1 in the screw mechanism 110 to the lock sleeve 94 of the differential lock mechanism 82. The third transmission mechanism 112c includes the connection mechanism 124, the fork shaft 126, the fork 128, the high-low sleeve 86, the first spring 96, and the second spring 98.

In the transfer 22 having the aforementioned configuration, an amount of rotation of the motor shaft of the electric motor 108 is controlled according to an electric motor control command signal Sw which is supplied from the electronic control unit 200 to the electric motor 108 and, for example, when a position of the nut member 116 in the direction of the first rotation axis CL1 in the screw mechanism 110 is switched, the operating state of the transfer 22 is sequentially switched.

For example, when the position of the nut member 116 is switched to a predetermined L4L position by the electric motor 108, the outer circumferential teeth 86b of the high-low sleeve 86 moves to a position at which they engage with the low-side gear teeth 90 by the transmission mechanism 112. As described above, when the outer circumferential teeth 86b of the high-low sleeve 86 engage with the low-side gear teeth 90, the outer circumferential teeth 94a of the lock sleeve 94 engage with the lock teeth 92 with the biasing forces of the first spring 96 and the second spring 98. Accordingly, in the transfer 22, when the nut member 116 is located at the L4L position, the low-speed gear stage L is formed in the high-low switching mechanism 72 and differential rotation between the front propeller shaft 24 and the rear propeller shaft 26 in the differential lock mechanism 82 is limited.

When the position of the nut member 116 is switched to a predetermined H2 position by the electric motor 108, the outer circumferential teeth 86b of the high-low sleeve 86 engage with the high-side gear teeth 88 and the piston 106 moves to a position at which it is separated from the frictional engagement element 104 of the front-wheel-driving clutch 74. Accordingly, in the transfer 22, when the nut member 116 is located at the H2 position, the high-speed gear stage H is formed in the high-low switching mechanism 72 and the front-wheel-driving clutch 74 is disengaged.

When the position of the nut member 116 is switched to a predetermined H4A position by the electric motor 108, the outer circumferential teeth 86b of the high-low sleeve 86 engage with the high-side gear teeth 88 and the piston 106 moves to a position at which it presses the frictional engagement element 104 of the front-wheel-driving clutch 74. Accordingly, in the transfer 22, when the nut member 116 is located at the H4A position, the high-speed gear stage H is formed in the high-low switching mechanism 72 and the front-wheel-driving clutch 74 is slipping-engaged.

When the position of the nut member 116 is switched to a predetermined H4L position by the electric motor 108, the outer circumferential teeth 86b of the high-low sleeve 86 engage with the high-side gear teeth 88 and the piston 106 moves to a position at which it presses the frictional engagement element 104 of the front-wheel-driving clutch 74. Accordingly, in the transfer 22, when the nut member 116 is located at the H4L position, the high-speed gear stage H is formed in the high-low switching mechanism 72 and the front-wheel-driving clutch 74 is fully engaged.

In the transfer 22 having the aforementioned configuration, a drive power from a drive power source under traveling can be transmitted from the input shaft 66 to the front wheels 14 and the rear wheels 16 and a drive power distribution ratio of the drive powers which are transmitted from the drive power source under traveling to the front wheels 14 and the rear wheels 16 can be adjusted, that is, a rear-wheel distribution ratio Xr (Xr=Pr/Ptotal) which is a ratio of a drive power Pr transmitted from the drive power source under traveling to the rear wheels 16 to a total drive power Ptotal (Ptotal=Pr+Pf) transmitted from the drive power source under traveling to the rear wheels 16 and the front wheels 14 can be adjusted, by switching between the differential state and the non-differential state in the differential lock mechanism 82 or adjusting a torque capacity of the front-wheel-driving clutch 74. "Pf" is a drive power which is transmitted from the drive power source under traveling to the front wheels 14. For example, when the nut member 116 is located at the H2 position and the piston 106 does not press the frictional engagement element 104, the torque capacity of the front-wheel-driving clutch 74 is zero. At this time, the front-wheel-driving clutch 74 is disengaged and the rear-wheel distribution ratio Xr is 1.0. In other words, the drive power distribution ratio of the drive powers transmitted to the front wheels 14 and the rear wheels 16 is 0 (front wheels):100 (rear wheels). On the other hand, when the nut member 116 is located at the H4A position and the piston 106 presses the frictional engagement element 104, the torque capacity of the front-wheel-driving clutch 74 is greater than zero and the rear-wheel distribution ratio Xr decreases as the torque capacity of the front-wheel-driving clutch 74 increases. When the nut member 116 is located at the H4L position and the front-wheel-driving clutch 74 has a torque capacity with which it is fully engaged, the rear-wheel distribution ratio Xr is 0.5. In other words, the drive power distribution ratio of the drive powers transmitted to the front wheels 14 and the rear wheels 16 is 50 (front wheels):50 (rear wheels). When the nut member 116 is located at the L4L position and the differential rotation between the front propeller shaft 24 and the rear propeller shaft 26 in the differential lock mechanism 82 is limited, the rear-wheel distribution ratio Xr is 0.5. In this way, by switching the differential lock mechanism 82 between the differential state and the non-differential state or adjusting the torque capacity of the front-wheel-driving clutch 74, the transfer 22 can adjust the rear-wheel distribution ratio Xr between 1.0 and 0.5, that is, adjust the drive power distribution ratio of the drive powers transmitted to the front wheels 14 and the rear wheels 16 between 0 (front wheels): 100 (rear wheels) and 50 (front wheels):50 (rear wheels). The transfer 22 corresponds to a drive power distribution device in the claims.

Referring back to FIG. 1, the four-wheel-drive vehicle 10 includes a brake device 130 that generates a braking force (a braking torque) in the front wheel 14L, the front wheel 14R, the rear wheel 16L, and the rear wheel 16R and that is a so-called disc brake which is well known as a normal brake. As illustrated in FIG. 1, a first wheel brake (wheel brake) 132 provided in the front wheel 14L, a second wheel brake (wheel brake) 134 provided in the front wheel 14R, a third wheel brake (wheel brake) 136 provided in the rear wheel 16L, a fourth wheel brake (wheel brake) 138 provided in the rear wheel 16R, a brake actuator 140, and the like are provided in the brake device 130.

As illustrated in FIG. 1, the first wheel brake 132 includes a first disc 132a that is fixed to the front wheel axle 32L and rotates with the front wheel 14L and a first caliper 132b that is provided in a member constituting a suspension connected to the vehicle body or the like and presses the first disc 132a via a brake pad (not illustrated) with a brake oil pressure Br [MPa] supplied from a master cylinder 144 according to an operation amount of a brake pedal 142. The second wheel brake 134 includes a second disc 134a that is fixed to the front wheel axle 32R and rotates with the front wheel 14R and a second caliper 134b that is provided in a member constituting the suspension connected to the vehicle body or the like and presses the second disc 134a via a brake pad (not illustrated) with a brake oil pressure Br supplied from the master cylinder 144 according to an operation amount of the brake pedal 142. The third wheel brake 136 includes a third disc 136a that is fixed to the rear wheel axle 34L and rotates with the rear wheel 16L and a third caliper 136b that is provided in a member constituting the suspension connected to the vehicle body or the like and presses the third disc 136a via a brake pad (not illustrated) with a brake oil pressure Br supplied from the master cylinder 144 according to an operation amount of the brake pedal 142. The fourth wheel brake 138 includes a fourth disc 138a that is fixed to the rear wheel axle 34R and rotates with the rear wheel 16R and a fourth caliper 138b that is provided in a member constituting the suspension connected to the vehicle body or the like and presses the fourth disc 138a via a brake pad (not illustrated) with a brake oil pressure Br supplied from the master cylinder 144 according to an operation amount of the brake pedal 142. The brake actuator 140 includes, for example, a hydraulic pump or an accumulator that generates a source pressure of the brake oil pressure Br and a plurality of solenoid valves 146 that adjusts the brake oil pressures Br of the calipers 132b, 134b, 136b, and 138b provided in the wheels, and is a device that supplies the brake oil pressures Br to the calipers 132b, 134b, 136b, and 138b of the wheels according to a brake command signal Sb from the electronic control unit 200 and adjusts and controls the brake oil pressures Br supplied hereto. That is, the braking forces of the first wheel brake 132, the second wheel brake 134, the third wheel brake 136, and the fourth wheel brake 138 provided in the brake device 130 can be individually adjusted according to the brake command signal Sb from the electronic control unit 200.

Referring back to FIG. 1, the four-wheel-drive vehicle 10 includes an electronic control unit 200 which is a controller including a control device for the four-wheel-drive vehicle 10 associated with control of the engine 12, the stepless transmission 44, the stepped transmission 46, the transfer 22, the brake device 130, and the like. FIG. 1 is a diagram illustrating an input and output system of the electronic control unit 200 and is a functional block diagram illustrating a principal part of the control function of the electronic control unit 200. The electronic control unit 200 is configured to include, for example, a so-called microcomputer including a CPU, a RAM, a ROM, and an input/output interface, and the CPU performs various types of control of the four-wheel-drive vehicle 10 by performing signal processing in accordance with a program which is stored in the ROM in advance using a temporary storage function of the RAM. The electronic control unit 200 may include a computer for engine control and a computer for gear shifting control according to necessity. The electronic control unit 200 corresponds to a control device that controls a drive power source and a drive power distribution device in the claims.

Various signals (for example, an engine rotation speed Ne, an output rotation speed No corresponding to a vehicle speed V, an MG1 rotation speed Ng which is the rotation speed of the first rotary machine MG1, an MG2 rotation speed Nm which is an input rotation speed Ni, a rotation angle θ of the motor shaft of the electric motor 108, an accelerator operation amount θacc which is a driver's amount of operation of an accelerator pedal indicating the magnitude of the driver's accelerating operation, a throttle valve opening θth which is an opening of an electronic throttle valve, an ON/OFF signal indicating whether a request for selecting a non-differential state (a differential lock state) in which differential rotation between the rear propeller shaft 26 and the front propeller shaft 24 in the differential lock mechanism 82 is limited has been issued from the driver, longitudinal acceleration Gx and lateral acceleration Gy of the four-wheel-drive vehicle 10, a battery temperature THbat, a battery charging/discharging current That, or a battery voltage Vbat of the battery 40, a hydraulic oil temperature THoil which is the temperature of a hydraulic oil OIL, a brake operation amount Bra [%] which is an amount of operation of the brake pedal 142 which is operated by a driver to activate the wheel brakes 132, 134, 136, and 138, a yaw rate Ryaw which is a rotational angular velocity around a vertical axis of the four-wheel-drive vehicle 10, and a steering angle θsw of a steering wheel provided in the four-wheel-drive vehicle 10) based on detection values from various sensors (for example, an engine rotation speed sensor 150, an output rotation speed sensor 152, an MG1 rotation speed sensor 154, an MG2 rotation speed sensor 156, a rotation angle sensor 158, an accelerator operation amount sensor 160, a throttle valve opening sensor 162, a differential lock selection switch 164, a G sensor 166, a battery sensor 168, an oil temperature sensor 170, a brake operation amount sensor 172, a yaw rate sensor 174, and a steering sensor 176) provided in the four-wheel-drive vehicle 10 are supplied to the electronic control unit 200.

Various command signals (for example, an engine control command signal Se for controlling the engine 12, rotary machine control command signals Smg for controlling the first rotary machine MG1 and the second rotary machine MG2, hydraulic pressure control command signals Sat for controlling the operating states of the engagement devices CB, an electric motor control command signal Sw for controlling the electric motor 108, and a brake command signal Sb for controlling the brake device 130) are output from the electronic control unit 200 to various devices (for example, the engine control device 36, the inverter 38, the hydraulic pressure control circuit 58, the electric motor 108, and the brake device 130) provided in the four-wheel-drive vehicle 10. The hydraulic pressure control command signal Sat is also a hydraulic pressure control command signal for controlling gear shifting of the stepped transmission 46 and is, for example, a command signal for driving the solenoid valves that adjust hydraulic pressures Pc1, Pc2, Pb1, and Pb2 supplied to hydraulic actuators of the engagement devices CB (the clutch C1, the clutch C2, the brake B1, and the brake B2). The electronic control unit 200 sets hydraulic pressure command values corresponding to values of the hydraulic pressures Pc1, Pc2, Pb1, and Pb2 and outputs a drive current or a drive voltage corresponding to the hydraulic pressure command values to the hydraulic pressure control circuit 58. The brake command signal Sb is a command signal for driving the solenoid valve 146 provided in the brake actuator 140 to control the brake oil pressures Br of the first caliper 132b, the second caliper 134b, the third caliper 136b, and the fourth caliper 138b.

In order to realize various types of control in the four-wheel-drive vehicle 10, the electronic control unit 200 includes a stepped gear shifting control unit 180 serving as a stepped gear shifting control means, a hybrid control unit 182 serving as a hybrid control means, a four-wheel-drive control unit 184 serving as a four-wheel-drive control means, a yaw rate control unit 186 serving as a yaw rate control means, and a brake control unit 188 serving as a brake control means.

Figure 6:
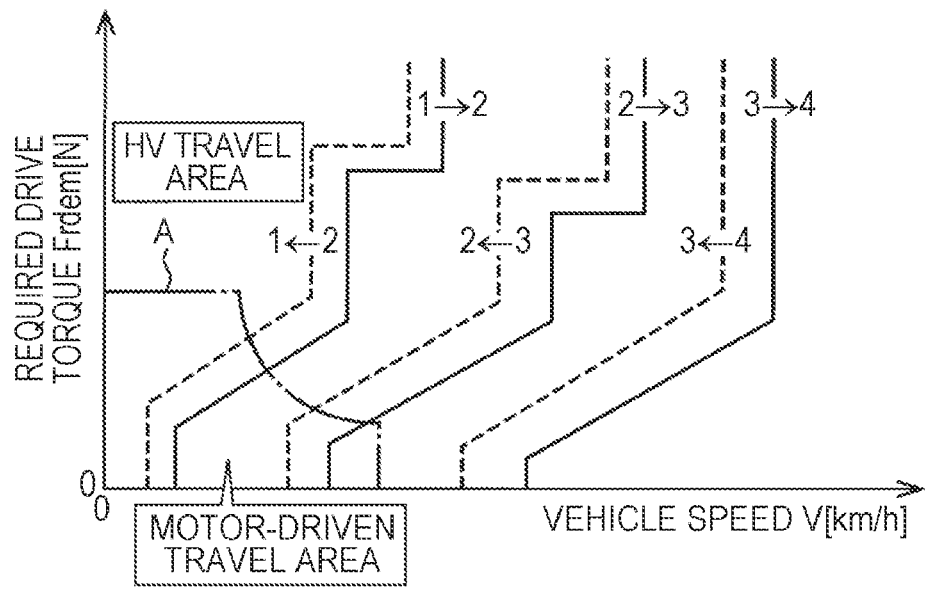
FIG. 6 is a diagram illustrating an example of an AT gear stage shifting map which is used for control of gear shifting of a stepped transmission and a power source switching map which is used for control of switching between hybrid travel and motor-driven travel and illustrating a relationship therebetween.

The stepped gear shifting control unit 180 performs gear shifting determination of the stepped transmission 46, for example, using an AT gear stage shifting map illustrated in FIG. 6 which is a relationship which has been calculated and stored in advance by experiment or design, that is, a predetermined relationship, and outputs a hydraulic pressure control command signal Sat for performing gear shifting control of the stepped transmission 46 to the hydraulic pressure control circuit 58 according to necessity. The AT gear stage shifting map is, for example, a predetermined relationship with gear shift lines used to determine gear shifting of the stepped transmission 46 on a two-dimensional coordinate system with the vehicle speed V and the required drive power Frdem as variables. Here, the output rotation speed No or the like may be used instead of the vehicle speed V. A required drive torque Trdem, the accelerator operation amount θacc, the throttle valve opening θth, or the like may be used instead of the required drive power Frdem. The gear shift lines in the AT gear stage shifting map include upshift lines for determining an upshift as indicated by solid lines and downshift lines for determining a downshift as indicated by dotted lines.

The hybrid control unit 182 has a function of an engine control means, that is, an engine control unit, that controls the operation of the engine 12 and a function of a rotary machine control means, that is, a rotary machine control unit, that controls the operations of the first rotary machine MG1 and the second rotary machine MG2 via the inverter 38, and performs hybrid drive control or the like using the engine 12, the first rotary machine MG1, and the second rotary machine MG2 based on the control functions. The hybrid control unit 182 calculates the required drive power Frdem which is a required drive amount, for example, by applying the accelerator operation amount θacc and the vehicle speed V to a required drive amount map which is a predetermined relationship. As the required drive amount, a required drive torque Trdem [Nm] in each of the driving wheels (the front wheels 14 and the rear wheels 16), a required drive power Prdem [W] in each in the driving wheel, a required AT output torque in the output shaft 60, or the like may be used in addition to the required drive power Frdem [N].

The hybrid control unit 182 outputs the engine control command signal Se which is a command signal for controlling the engine 12 and the rotary machine control command signals Smg which are command signals for controlling the first rotary machine MG1 and the second rotary machine MG2 in order to realize the required drive power Prdem based on the required drive torque Trdem and the vehicle speed V in consideration of chargeable electric power Win and dischargeable electric power Wout of the battery 40 or the like. The engine control command signal Se is, for example, a command value for an engine power Pe which is the power of the engine 12 for outputting the engine torque Te at the engine rotation speed Ne at that time. The rotary machine control command signal Smg is, for example, a command value for the generated electric power Wg of the first rotary machine MG1 for outputting the MG1 torque Tg at the MG1 rotation speed Ng at the time of outputting a command as a reaction torque of the engine torque Te and a command value for power consumption Wm of the second rotary machine MG2 for outputting the MG2 torque Tm at the MG2 rotation speed Nm at the time of outputting a command.

The chargeable electric power Win of the battery 40 is possible input electric power for defining limitation of input electric power of the battery 40 and the dischargeable electric power Wout of the battery 40 is possible output electric power for defining limitation of output electric power of the battery 40. The chargeable electric power Win or the dischargeable electric power Wout of the battery 40 is calculated, for example, based on the battery temperature THbat and a state of charge value SOC [%] corresponding to an amount of electric power charged in the battery 40 by the electronic control unit 200. The state of charge value SOC of the battery 40 is a value indicating a state of charge of the battery 40 and is calculated, for example, based on the battery charging/discharging current Ibat and the battery voltage Vbat by the electronic control unit 200.

For example, when the stepless transmission 44 operates as a stepless transmission and a combined transmission 63 in which the stepless transmission 44 and the stepped transmission 46 are arranged in series operates as a stepless transmission as a whole, the hybrid control unit 182 performs stepless gear shifting control of the stepless transmission 44 to change the gear ratio γ0 of the stepless transmission 44 by controlling the engine 12 and controlling the generated electric power Wg of the first rotary machine MG1 such that the engine rotation speed Ne and the engine torque Te with which the engine power Pe for realizing the required drive power Prdem is obtained are achieved in consideration of an optimal engine operating point or the like. As a result of this control, the gear ratio γt (γt=γ0×γat) of the combined transmission 63 at the time of operating as a stepless transmission is controlled.

For example, when the stepless transmission 44 is shifted like a stepped transmission and the combined transmission 63 is shifted like a stepped transmission as a whole, the hybrid control unit 182 performs gear shifting determination of the combined transmission 63, for example, using a gear shifting map which is a predetermined relationship and performs gear shifting control of the stepless transmission 44 such that a plurality of gear stages is selectively formed in cooperation with gear shifting control of the AT gear stages of the stepped transmission 46 which is performed by the stepped gear shifting control unit 180.

The hybrid control unit 182 selectively establishes an EV travel mode or an HV travel mode as a travel mode according to a travel state. For example, the hybrid control unit 182 establishes the EV travel mode in an EV travel area in which the required drive power Prdem is less than a predetermined threshold value, and establishes the HV travel mode in an HV travel area in which the required drive power Prdem is equal to or greater than the predetermined threshold value. An alternate long and short dash line A in FIG. 6 denotes is a boundary line for determining whether at least the engine 12 is to be used as the drive power source for travel of the four-wheel-drive vehicle 10 or whether only the second rotary machine MG2 is to be used as the drive power source. That is, the alternate long and short dash line A in FIG. 6 is a boundary line between the HV travel area and the EV travel area for switching between the HV travel and the EV travel. A predetermined relationship including the boundary line indicated by the alternate long and short dash line A in FIG. 6 is an example of a drive power source switching map plotted in a two-dimensional coordinate system with the vehicle speed V and the required drive power Frdem as variables. In FIG. 6, for the purpose of convenience, the drive power source switching map is illustrated together with the AT gear stage shifting map.

When the required drive power Prdem is in the EV travel area and the state of charge value SOC of the battery 40 is less than a predetermined engine-starting threshold value, the hybrid control unit 182 establishes the HV travel mode. The EV travel mode is a travel state in which the operation of the engine 12 is stopped and the second rotary machine MG2 is caused to generate a drive torque. The HV travel mode is a travel state in which the engine 12 is operated. The engine-starting threshold value is a predetermined threshold value for determining a state of charge value SOC with which the engine 12 needs to be forcibly started to charge the battery 40.

When the operation of the engine 12 is stopped and the HV travel mode is established, the hybrid control unit 182 performs engine start control for starting the engine 12. At the time of starting the engine 12, the hybrid control unit 182 starts the engine 12 by performing ignition when the engine rotation speed Ne is equal to or greater than a predetermined rotation speed at which ignition is possible while increasing the engine rotation speed Ne using the first rotary machine MG1. That is, the hybrid control unit 182 starts the engine 12 by cranking the engine 12 using the first rotary machine MG1.

The four-wheel-drive control unit 184 adjusts the rear-wheel distribution ratio Xr which is a ratio (Pr/Ptotal) of the drive power Pr transmitted from the drive power source under traveling to the rear wheels 16 to the total drive power Ptotal transmitted from the drive power source under traveling to the front wheels 14 and the rear wheels 16. For example, the four-wheel-drive control unit 184 adjusts the rear-wheel distribution ratio Xr to an appropriate value, for example, by controlling the electric motor 108 to adjust the torque capacity of the front-wheel-driving clutch 74 according to the travel state of the four-wheel-drive vehicle 10 which is determined with the output rotation speed sensor 152, the G sensor 166, or the like. For example, when a driver operates the differential lock selection switch 164, the four-wheel-drive control unit 184 controls the rear-wheel distribution ratio Xr such that it is 0.5 (that is, controls the drive power distribution ratio of the drive powers transmitted to the front wheels 14 and the rear wheels 16 such that it is 50 (front wheels):50 (rear wheels)) by limiting the differential rotation between the rear propeller shaft 26 and the front propeller shaft 24 in the differential lock mechanism 82.

The hybrid control unit 182 includes a regeneration control unit 190 that serves as a regeneration control means. The regeneration control unit 190 performs regeneration control for causing the second rotary machine MG2 to perform regeneration such that a target deceleration Gtgt corresponding to the brake operation amount Bra by which a driver operates the brake pedal 142 is acquired at the time of vehicle deceleration in which the driver operates the brake pedal 142. The regeneration control is to control a regenerative torque Tm of the second rotary machine MG2 such that a required regenerative torque Tmdem at which the target deceleration Gtgt is obtained is reached. The required regenerative torque Tmdem is calculated, for example, according to a relationship which is predetermined by the driver's brake operation amount Bra detected from the brake operation amount sensor 172.

The yaw rate control unit 186 includes a starting condition satisfaction determining unit 186a that serves as a starting condition satisfaction determining means and an ending condition satisfaction determining unit 186b that serves as an ending condition satisfaction determining means. The starting condition satisfaction determining unit 186a determines whether a starting condition CDS for starting yaw rate control which is performed by the yaw rate control unit 186 has been satisfied. The starting condition satisfaction determining unit 186a determines that the starting condition CDS has been satisfied, for example, when a yaw rate difference ΔRyaw is equal to or greater than a predetermined oversteering determination value or the yaw rate difference ΔRyaw is equal to or less than a predetermined understeering determination value. The yaw rate difference ΔRyaw is a value (ΔRyaw=Ryaw−Ryaw*) which is obtained by subtracting a target yaw rate Ryaw* from an actual yaw rate Ryaw detected by the yaw rate sensor 174. The target yaw rate Ryaw* is calculated based on a steering angle θsw during turning, the vehicle speed V, and the like. The oversteering determination value is a determination value for determining oversteering and is a positive value. The understeering determination value is a determination value for determining understeering and is a negative value.

The ending condition satisfaction determining unit 186b determines whether an ending condition CDE for ending the yaw rate control which is performed by the yaw rate control unit 186 has been satisfied. For example, the ending condition satisfaction determining unit 186b determines that the ending condition CDE has been satisfied, for example, when the yaw rate difference ΔRyaw is less than the oversteering determination value and greater than the understeering determination value and a predetermined time has elapsed in a state in which brake control amounts of the first wheel brake 132, the second wheel brake 134, the third wheel brake 136, and the fourth wheel brake 138 which are required for the yaw rate control are zero.

When the starting condition satisfaction determining unit 186a determines that the starting condition CDS has been satisfied, the yaw rate control unit 186 performs yaw rate control, for example, in cooperation with the brake control unit 188 and the four-wheel-drive control unit 184 such that the actual yaw rate Ryaw detected by the yaw rate sensor 174 reaches the target yaw rate Ryaw* until the ending condition satisfaction determining unit 186b determines that the ending condition CDE has been satisfied. For example, the yaw rate control unit 186 performs yaw rate control for controlling the braking forces of the first wheel brake 132, the second wheel brake 134, the third wheel brake 136, and the fourth wheel brake 138 and the rear-wheel distribution ratio Xr such that the actual yaw rate Ryaw reaches the target yaw rate Ryaw*.

The regeneration control unit 190 includes a limitation unit 190a that serves as a limitation means and an ending control unit 190b that serves as an ending control means. When a predetermined first condition CD1 and a predetermined second condition CD2 are satisfied, the limitation unit 190a limits the regenerative torque Tm of the second rotary machine MG2 based on the regeneration control which is being performed by the regeneration control unit 190 in comparison with a case in which yaw rate control is not being performed by the yaw rate control unit 186. The first condition CD1 is satisfied when regeneration control is being performed by the regeneration control unit 190. The second condition CD2 is satisfied when yaw rate control is being performed by the yaw rate control unit 186, that is, when the starting condition satisfaction determining unit 186a determines that the starting condition CDS has been satisfied and the ending condition satisfaction determining unit 186b determines that the ending condition CDE has not been satisfied. For example, when the first condition CD1 and the second condition CD2 are satisfied and when the required regenerative torque Tmdem calculated by the regeneration control unit 190 increases, that is, when the current required regenerative torque Tmdem_n calculated by the regeneration control unit 190 changes in a direction in which it grows apart from zero [Nm] with respect to the previous required regenerative torque Tmdem_n−1, the limitation unit 190a limits change of the regenerative torque Tm such that the regenerative torque Tm does not change. When the required regenerative torque Tmdem calculated by the regeneration control unit 190 decreases, that is, when the current required regenerative torque Tmdem_n calculated by the regeneration control unit 190 changes in a direction in which it approaches zero [Nm] with respect to the previous required regenerative torque Tmdem_n−1, the limitation unit 190a permits change of the regenerative torque Tm such that the regenerative torque Tm reaches the required regenerative torque Tmdem.

When the yaw rate control performed by the yaw rate control unit 186 ends, that is, when the ending condition satisfaction determining unit 186b determines that the ending condition CDE has been satisfied, the ending control unit 190b performs ending control for changing the regenerative torque Tm to the required regenerative torque Tmdem, for example, at a preset constant rate of change HR such that a driver does not feel discomfort due to the change of the regenerative torque Tm until the regenerative torque Tm reaches the required regenerative torque Tmdem. The rate of change HR is a rate of change at which the regenerative torque Tm changes per unit time. When the regenerative torque Tm reaches the required regenerative torque Tmdem, the ending control unit 190b ends the ending control.

When the limitation unit 190a limits the regenerative torque Tm of the second rotary machine MG2 based on the regeneration control, the brake control unit 188 controls the braking forces of the first wheel brake 132, the second wheel brake 134, the third wheel brake 136, and the fourth wheel brake 138 such that insufficiency of the braking force of the four-wheel-drive vehicle 10 due to limitation of the regenerative torque Tm is compensated for. For example, when the limitation unit 190a limits the regenerative torque Tm of the second rotary machine MG2 based on the regeneration control, the brake control unit 188 controls the braking forces of the first wheel brake 132, the second wheel brake 134, the third wheel brake 136, and the fourth wheel brake 138 such that insufficiency of the braking force of the four-wheel-drive vehicle 10 which is calculated from a difference (Tmdem−Tm) between the required regenerative torque Tmdem and the regenerative torque Tm is compensated for.

Figure 7:
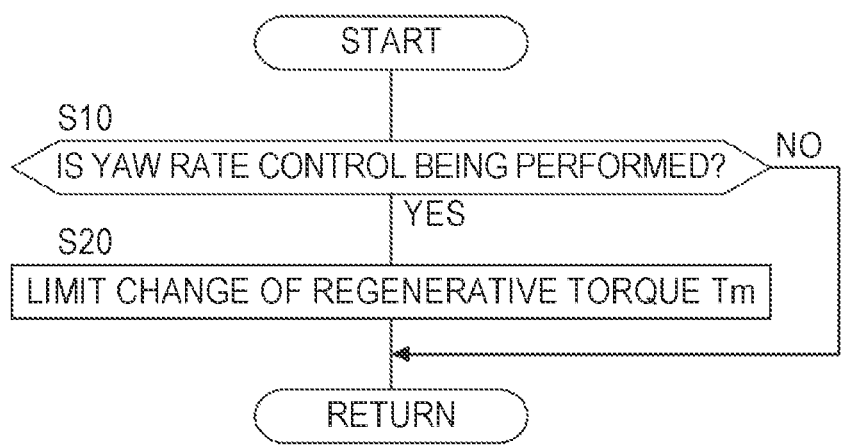
FIG. 7 is a flowchart illustrating a principal part of a control operation of an electronic control unit illustrated in FIG. 1 and illustrating a control operation of regeneration control when yaw rate control and regeneration control are performed together.
Figure 8:
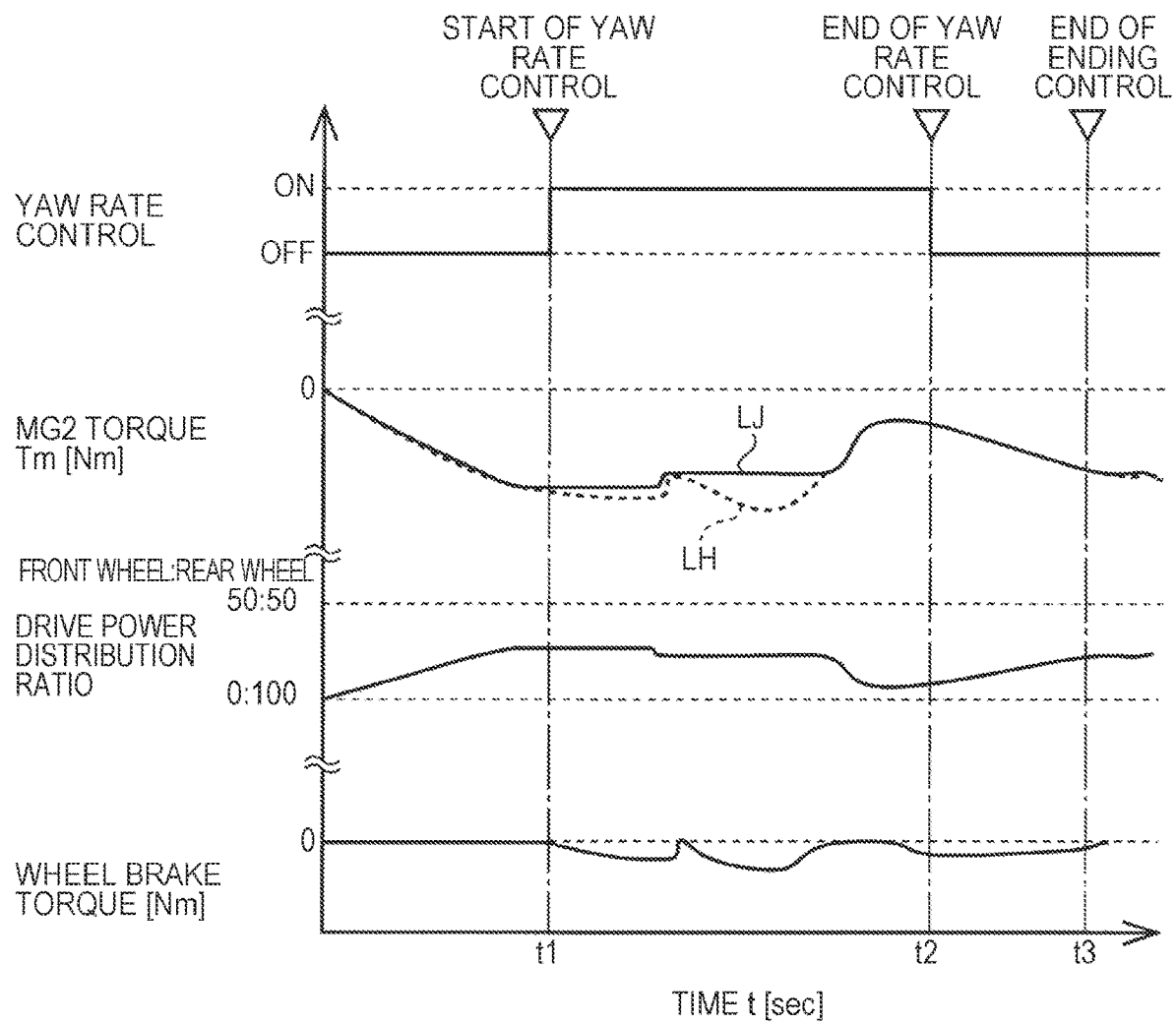
FIG. 8 is a diagram illustrating an example of a timing chart when the control operation of the electronic control unit illustrated in FIG. 7 is performed.

FIG. 7 is a flowchart illustrating a principal part of a control operation of the electronic control unit 200 and illustrating a control operation of regeneration control when yaw rate control and regeneration control are performed. FIG. 8 is a diagram illustrating an example of a timing chart when the control operation of the electronic control unit 200 illustrated in FIG. 7 is performed. The flowchart illustrated in FIG. 7 is started when regeneration control is being performed.

First, in Step (the word "Step" is omitted below) S10 corresponding to the function of the starting condition satisfaction determining unit 186a and the ending condition satisfaction determining unit 186b, it is determined whether yaw rate control is being performed. When the determination result of S10 is negative, that is, when yaw rate control is not being performed, this routine ends. When the determination result of S10 is positive (between time point t1 and time point t2 in FIG. 8), that is, when yaw rate control is being performed, S20 corresponding to the function of the limitation unit 190a is performed. In S20, for example, when a required regenerative torque Tmdem increases, change of the regenerative torque Tm is limited.

In the timing chart illustrated in FIG. 8, in a period between time point t1 and time point t2 in which yaw rate control and regeneration control are performed, change of the regenerative torque Tm is limited such that the regenerative torque Tm does not change when the required regenerative torque Tmdem increases, and change of the regenerative torque Tm is permitted such that the regenerative torque Tm reaches the required regenerative torque Tmdem when the required regenerative torque Tmdem decreases. In the MG2 torque Tm, that is, the regenerative torque Tm, in the timing chart illustrated in FIG. 8, a solid line LJ denotes an actual regenerative torque Tm and a dotted line LH denotes the required regenerative torque Tmdem. As illustrated in FIG. 8, when change of the regenerative torque Tm is limited, wheel brake torques, that is, braking forces of the first wheel brake 132, the second wheel brake 134, the third wheel brake 136, and the fourth wheel brake 138, increase such that insufficiency of the braking force of the four-wheel-drive vehicle 10 due to limitation of change of the regenerative torque Tm is compensated for. For example, since the MG2 torque Tm of the second rotary machine MG2 is a powering torque at a positive torque which is an acceleration side and is a regenerative torque at a negative torque which is a deceleration side at the time of positive rotation as described above, the above expression "the required regenerative torque Tmdem increases" means that the value of the MG2 torque Tm increases on the negative side and the above expression "the required regenerative torque Tmdem decreases" means that the value of the MG2 torque Tm decreases on the negative side.

In the timing chart illustrated in FIG. 8, when yaw rate control ends (at time point t2), ending control for changing the regenerative torque Tm toward the required regenerative torque Tmdem at a preset constant rate of change HR until the regenerative torque Tm reaches the required regenerative torque Tmdem is performed. In the timing chart illustrated in FIG. 8, time point t1 is a time point at which yaw rate control is started, that is, a time point at which the starting condition satisfaction determining unit 186a determines that the starting condition CDS has been satisfied. Time point t2 is a time point at which yaw rate control is ended, that is, a time point at which the ending condition satisfaction determining unit 186b determines that the ending condition CDE has been satisfied. Time point t3 is a time point at which ending control is ended, that is, a time point at which the regenerative torque Tm has reached the required regenerative torque Tmdem.

With the four-wheel-drive vehicle 10 according to this embodiment as described above, when regeneration control and yaw rate control are performed together, the regenerative torque Tm of the second rotary machine MG2 based on the regeneration control is limited in comparison with a case in which the yaw rate control is not performed. Accordingly, since an influence of the regenerative torque Tm controlled by the regeneration control on the yaw rate control can be suitably curbed, it is possible to curb deterioration in conformability of an actual yaw rate Ryaw with a target yaw rate Ryaw* in the yaw rate control.

With the four-wheel-drive vehicle 10 according to this embodiment, since the braking forces of the first wheel brake 132, the second wheel brake 134, the third wheel brake 136, and the fourth wheel brake 138 provided in the wheels are controlled such that insufficiency of the braking force of the four-wheel-drive vehicle 10 due to limitation of the regenerative torque Tm based on the regeneration control in comparison with a case in which the yaw rate control is not performed is compensated for, it is possible to curb insufficiency of the braking force of the four-wheel-drive vehicle 10 using the braking forces of the first wheel brake 132, the second wheel brake 134, the third wheel brake 136, and the fourth wheel brake 138 and to curb deterioration in the conformability of the actual yaw rate Ryaw with the target yaw rate Ryaw*.

With the four-wheel-drive vehicle 10 according to this embodiment, when the yaw rate control and the regeneration control are performed together and the required regenerative torque Tmdem increases, change of the regenerative torque Tm is limited and thus it is possible to curb an influence of the regeneration control on the yaw rate control.

With the four-wheel-drive vehicle 10 according to this embodiment, when the yaw rate control and the regeneration control are performed together and the required regenerative torque Tmdem decreases, the regeneration control is permitted and thus it is possible to appropriately make the yaw rate control and the regeneration control be compatible with each other.

With the four-wheel-drive vehicle 10 according to this embodiment, since ending control for changing the regenerative torque Tm at a preset constant rate of change HR until the regenerative torque Tm reaches the required regenerative torque Tmdem is performed when the yaw rate control ends, it is possible to appropriately curb change of the regenerative torque Tm changing per unit time after the yaw rate control has ended.

With the four-wheel-drive vehicle 10 according to this embodiment, since the braking forces of the first wheel brake 132, the second wheel brake 134, the third wheel brake 136, and the fourth wheel brake 138 and the rear-wheel distribution ratio Xr of the transfer 22 are controlled such that the actual yaw rate Ryaw conforms to the target yaw rate Ryaw* in the yaw rate control, it is possible to appropriately make the actual yaw rate Ryaw conform to the target yaw rate Ryaw*.

Another embodiment of the present disclosure will be described below. In the following description, the same elements as in the aforementioned embodiment will be referred to by the same reference signs and description thereof will not be repeated.

Figure 9:
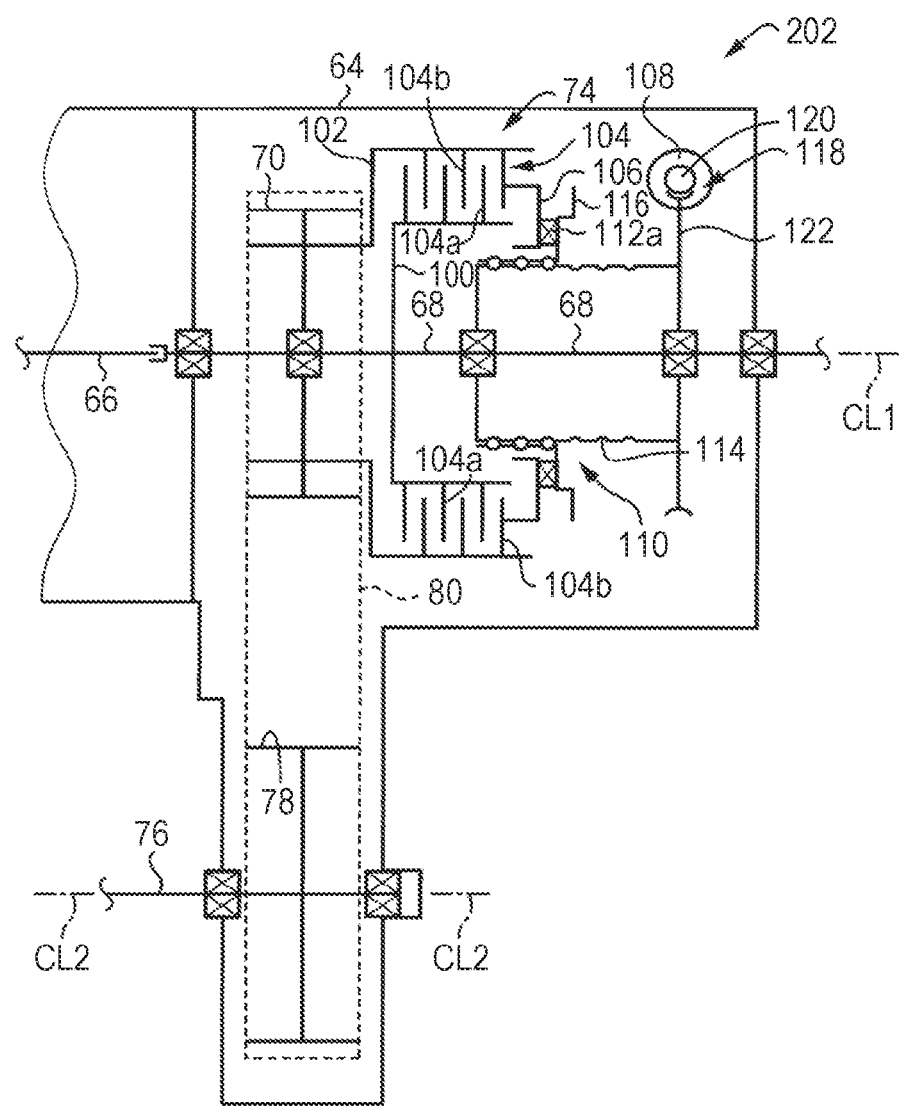
FIG. 9 is a skeleton diagram illustrating a structure of a transfer which is provided in a four-wheel-drive vehicle according to another embodiment of the present disclosure.

FIG. 9 is a diagram illustrating a four-wheel-drive vehicle according to another embodiment (a second embodiment) of the present disclosure and illustrating a transfer (drive power distribution device) 202 which is provided in the four-wheel-drive vehicle according to another embodiment of the present disclosure. The four-wheel-drive vehicle according to this embodiment is different from the four-wheel-drive vehicle 10 according to the first embodiment in that the structure of the transfer 202 is different from the transfer 22, and the other points are substantially the same as the four-wheel-drive vehicle 10 according to the first embodiment. That is, the transfer 202 does not include the high-low switching mechanism 72, the differential lock mechanism 82, the second transmission mechanism 112b, and the third transmission mechanism 112c unlike the transfer 22 according to the first embodiment and the input shaft 66 and the rear-wheel output shaft 68 are integrally connected.

The transfer 202 having the configuration illustrated in FIG. 9 can transmit a driver power from a drive power source under traveling to the rear wheels 16 which are main driving wheels and the front wheels 14 which are sub driving wheels and adjust a drive power distribution ratio of the drive powers transmitted to the rear wheels 16 and the front wheels 14, that is, a rear-wheel distribution ratio Xr, by adjusting a torque capacity of the front-wheel-driving clutch 74. For example, when the piston 106 does not press the frictional engagement element 104, the torque capacity of the front-wheel-driving clutch 74 is zero. At this time, the front-wheel-driving clutch 74 is disengaged and the drive power distribution ratio is 0 (front wheels):100 (rear wheels), that is, the rear-wheel distribution ratio Xr is 1.0. On the other hand, when the piston 106 presses the frictional engagement element 104, the torque capacity of the front-wheel-driving clutch 74 increases from zero and the rear-wheel distribution ratio Xr decreases as the torque capacity of the front-wheel-driving clutch 74 increases. When the torque capacity of the front-wheel-driving clutch 74 becomes a torque capacity with which it is fully engaged, the drive power distribution ratio is 50 (front wheels):50 (rear wheels), that is, the rear-wheel distribution ratio Xr is 0.5. In this way, the transfer 202 can adjust the drive power distribution ratio between 0 (front wheels):100 (rear wheels) and 50 (front wheels):50 (rear wheels), that is, adjust the rear wheel distribution ratio Xr between 1.0 and 0.5, by adjusting the torque capacity of the front-wheel-driving clutch 74.

While embodiments of the present disclosure have been described above in detail with reference to the accompanying drawings, the present disclosure can also be applied to other aspects.

For example, in the first embodiment, when the first condition CD1 and the second condition CD2 are satisfied and the required regenerative torque Tmdem calculated by the regeneration control unit 190 increases, the limitation unit 190a limits change of the regenerative torque Tm such that the regenerative torque Tm does not change, but, for example, the regeneration control which is being performed by the regeneration control unit 190 may be prohibited when the first condition CD1 and the second condition CD2 are satisfied. That is, in the timing chart illustrated in FIG. 8, when yaw rate control is started (time point t1), the regenerative torque Tm indicated by the solid line LJ may be kept zero until the yaw rate control is ended (time point t2). When yaw rate control is started (time point t1), the regenerative torque Tm may be decreased at a preset constant rate of change until the regenerative torque Tm is zero, and the regenerative torque Tm may be kept zero until the yaw rate control is ended (time point t2). By modifying the limitation unit 190a in this way, regeneration control in the four-wheel-drive vehicle 10 is prohibited when yaw rate control and regeneration control are performed together. Accordingly, it is possible to appropriately curb an influence of the regenerative torque Tm controlled by the regeneration control on the yaw rate control and thus it is possible to curb deterioration in the conformability of an actual yaw rate Ryaw with a target yaw rate Ryaw* in the yaw rate control. In addition, when the regeneration control is prohibited by the limitation unit 190a, the brake control unit 188 controls the braking forces of the first wheel brake 132, the second wheel brake 134, the third wheel brake 136, and the fourth wheel brake 138 such that insufficiency of the braking force of the four-wheel-drive vehicle 10 due to prohibition of the regeneration control is compensated for, and thus it is possible to curb insufficiency of the braking force of the four-wheel-drive vehicle 10 using the braking forces of the first wheel brake 132, the second wheel brake 134, the third wheel brake 136, and the fourth wheel brake 138 and to curb deterioration in the conformability of the actual yaw rate Ryaw with the target yaw rate Ryaw*. When the regeneration control is prohibited while the yaw rate control is being performed, the yaw rate control unit 186 controls the braking forces of the first wheel brake 132, the second wheel brake 134, the third wheel brake 136, and the fourth wheel brake 138 such that the actual yaw rate Ryaw conforms to the target yaw rate Ryaw*.

In the first embodiment, the four-wheel-drive vehicle 10 is a hybrid vehicle using the engine 12, the second rotary machine MG2, and the first rotary machine MG1 as drive power sources, but the applicable embodiment is not limited to the hybrid vehicle. For example, the present disclosure can be applied to an electric vehicle using only a rotary machine as a drive power source.

In the first embodiment, the four-wheel-drive vehicle 10 is a vehicle with a front-engine rear-wheel-drive (FR) type as a base, but the applicable embodiment is not limited thereto. For example, the present disclosure may be applied to a four-wheel-drive vehicle with a front-engine front-wheel-drive (FF) type as a base. In the case of a four-wheel-drive vehicle with a front-engine front-wheel-drive type as a base, the front wheels serve as main driving wheels and the rear wheels serve as sub driving wheels. The four-wheel-drive vehicle 10 is a part-time four-wheel-drive vehicle that switches between two-wheel drive and four-wheel drive depending on a traveling state, but the applicable embodiment is not limited to the part-time four-wheel-drive vehicle and may be a full-time four-wheel-drive vehicle. For example, the present disclosure may be applied to a full-time four-wheel-drive vehicle including a central differential gear unit (a center differential) having a differential limit clutch.

In the first embodiment, the piston 106 of the front-wheel-driving clutch 74 provided in the transfer 22 is configured to press the frictional engagement element 104 via the screw mechanism 110 that converts a rotational motion to a translational motion when the electric motor 108 rotates, but the applicable embodiment is not limited to this configuration. For example, the piston 106 may be configured to press the frictional engagement element 104 via a ball cam when the electric motor 108 rotates. The piston 106 may be driven by a hydraulic actuator.

The aforementioned embodiments are merely examples and the present disclosure can be embodied in aspects subjected to various modifications and improvements based on the knowledge of those skilled in the art.

What is claimed is:

1. A four-wheel-drive vehicle comprising:
a rotary machine that is a drive power source;
a transfer configured to transmit a drive power from the drive power source to front wheels and rear wheels and to adjust a drive power distribution ratio of the drive power which is transmitted from the drive power source to the front wheels and the rear wheels; and
an electric control unit configured to control the drive power source,
wherein each of the front wheels and the rear wheels includes a wheel brake of which a braking force is able to be independently adjusted,
wherein the electric control unit is configured to perform regeneration control for performing regeneration of the rotary machine at the time of deceleration,
wherein the electric control unit is configured to perform yaw rate control for adjusting the drive power distribution ratio by controlling the transfer such that an actual yaw rate of the four-wheel-drive vehicle conforms to a target yaw rate when a yaw rate starting condition is met, the yaw rate starting condition being when a yaw rate difference is equal to or greater than a predetermined oversteering determination value or the yaw rate difference is less than or equal to a predetermined understeering determination value, and
when the yaw rate starting condition is met so as to begin the yaw rate control while the regeneration control is being performed such that the regeneration control and the yaw rate control are performed together, the electric control unit is configured to limit a regenerative torque of the rotary machine based on the regeneration control in comparison with a case in which the yaw rate control is not performed and to control the braking forces of the wheel brakes provided in the wheels to compensate for insufficiency of a braking force of the four-wheel-drive vehicle due to the limiting of the regenerative torque based on the regeneration control.

2. The four-wheel-drive vehicle according to claim 1, wherein the regeneration control is to control the regenerative torque such that the regenerative torque reaches a required regenerative torque calculated from a brake operation amount of a driver, and wherein the electric control unit is configured to limit change of the regenerative torque when the yaw rate control is performed and the required regenerative torque increases.

3. The four-wheel-drive vehicle according to claim 2, wherein the electric control unit is configured to permit change of the regenerative torque when the yaw rate control is performed and the required regenerative torque decreases.

4. The four-wheel-drive vehicle according to claim 2, wherein the electric control unit is configured to perform ending control for changing the regenerative torque at a preset constant rate of change until the regenerative torque reaches the required regenerative torque when the yaw rate control ends.

5. The four-wheel-drive vehicle according to claim 1, wherein the electric control unit is configured to control the braking forces of the wheel brakes and the drive power distribution ratio such that the actual yaw rate conforms to the target yaw rate.

6. A four-wheel-drive vehicle comprising:
a rotary machine that is a drive power source;
a transfer configured to transmit a drive power from the drive power source to front wheels and rear wheels and to adjust a drive power distribution ratio of the drive power which is transmitted from the drive power source to the front wheels and the rear wheels; and
an electric control unit configured to control the drive power source, wherein each of the front wheels and the rear wheels includes a wheel brake of which a braking force is able to be independently adjusted, wherein the electric control unit is configured to perform regeneration control for performing regeneration of the rotary machine at the time of deceleration, wherein the electric control unit is configured to perform yaw rate control for adjusting the drive power distribution ratio by controlling the transfer such that an actual yaw rate of the four-wheel-drive vehicle conforms to a target yaw rate when a yaw rate starting condition is met, the yaw rate starting condition being when a yaw rate difference is equal to or greater than a predetermined oversteering determination value or the yaw rate difference is less than or equal to a predetermined understeering determination value, and when the yaw rate starting condition is met so as to begin the yaw rate control while the regeneration control is being performed, the electric control unit is configured to prohibit the regeneration control and to control the braking forces of the wheel brakes provided in the wheels to compensate for insufficiency of a braking force of the four-wheel-drive vehicle due to the prohibiting of the regeneration control.

7. The four-wheel-drive vehicle according to claim 6, wherein the electronic control unit is configured to control the braking force of the wheel brakes and the drive power distribution ratio such that the actual yaw rate conforms to the target yaw rate.

* * * * *